(12) United States Patent
Sabripour

(10) Patent No.: US 9,471,070 B2
(45) Date of Patent: Oct. 18, 2016

(54) ENVIRONMENTAL CONTROL SYSTEM INCLUDING DISTRIBUTED CONTROL ELEMENTS

(71) Applicant: Shey Sabripour, Austin, TX (US)

(72) Inventor: Shey Sabripour, Austin, TX (US)

( * ) Notice: Subject to any disclaimer, the term of this patent is extended or adjusted under 35 U.S.C. 154(b) by 0 days.

(21) Appl. No.: 14/499,051

(22) Filed: Sep. 26, 2014

(65) Prior Publication Data

US 2015/0019024 A1  Jan. 15, 2015

Related U.S. Application Data

(63) Continuation-in-part of application No. 13/345,698, filed on Jan. 7, 2012, now abandoned.

(60) Provisional application No. 61/431,202, filed on Jan. 10, 2011.

(51) Int. Cl.
| | | |
|---|---|---|
| *G05B 11/01* | (2006.01) | |
| *G05B 15/00* | (2006.01) | |
| *G05D 23/19* | (2006.01) | |
| *G06F 3/0484* | (2013.01) | |
| *G06N 3/063* | (2006.01) | |

(52) U.S. Cl.
CPC ...... *G05D 23/1927* (2013.01); *G05D 23/1917* (2013.01); *G06F 3/0484* (2013.01); *G06N 3/063* (2013.01)

(58) Field of Classification Search
CPC . G05D 23/1927; H04W 4/005; H04L 67/12; G05B 2219/13144; G05B 2219/32128; G06F 3/048
USPC ..................................................... 700/17, 83
See application file for complete search history.

(56) References Cited

U.S. PATENT DOCUMENTS

| | | | | |
|---|---|---|---|---|
| 5,277,363 | A * | 1/1994 | Hart .................. | G05D 23/1925 |
| | | | | 236/46 R |
| 5,395,042 | A * | 3/1995 | Riley et al. ................ | 236/46 R |
| 6,192,282 | B1 | 2/2001 | Smith et al. | |
| 6,484,069 | B2 * | 11/2002 | Osinga ......................... | 700/275 |
| 6,726,112 | B1 * | 4/2004 | Ho ..................... | G05D 23/1902 |
| | | | | 236/94 |
| 7,130,720 | B2 | 10/2006 | Fisher | |
| 7,586,408 | B1 * | 9/2009 | Mudge .......................... | 340/541 |
| 7,814,582 | B2 * | 10/2010 | Reddy et al. ..................... | 4/302 |
| 8,160,729 | B2 | 4/2012 | Ahmed | |
| 8,457,798 | B2 | 6/2013 | Hackett | |
| 8,521,453 | B1 * | 8/2013 | Silverman et al. ............. | 702/56 |
| 8,720,284 | B2 * | 5/2014 | Talikoti .................... | 73/862.324 |
| 2005/0201397 | A1 * | 9/2005 | Petite .................. | H04L 12/2825 |
| | | | | 370/401 |
| 2005/0270151 | A1 * | 12/2005 | Winick ....................... | 340/539.1 |
| 2006/0005312 | A1 * | 1/2006 | Reddy et al. ..................... | 4/668 |
| 2007/0029397 | A1 * | 2/2007 | Mueller ............. | G05D 23/1902 |
| | | | | 236/46 C |

(Continued)

OTHER PUBLICATIONS

Sabripour, Intelligent Energy System, Non-Final Office Action, U.S. Appl. No. 13/345,698, Mail Date: Mar. 6, 2013.

(Continued)

*Primary Examiner* — Ronald Hartman, Jr.
(74) *Attorney, Agent, or Firm* — Cesari & Reed LLP; R. Michael Reed

(57) ABSTRACT

An apparatus may include at least one sensor and a transmitter coupled to the at least one sensor and configured send data to a gateway through a wireless communication link. The apparatus may further include a solar cell configured to provide power to the at least one sensor and the transmitter. In some embodiments, the apparatus may include an adhesive backing configured to secure the apparatus to a structure.

20 Claims, 22 Drawing Sheets

(56) References Cited

U.S. PATENT DOCUMENTS

| | | | |
|---|---|---|---|
| 2008/0006708 A1* | 1/2008 | Gauger | F24F 11/0012 236/49.3 |
| 2010/0019051 A1* | 1/2010 | Rosen | F24F 11/0012 236/46 R |
| 2010/0187832 A1* | 7/2010 | Holland et al. | 290/1 A |
| 2010/0312881 A1* | 12/2010 | Davis | G01D 4/004 709/224 |
| 2011/0063126 A1 | 3/2011 | Kennedy et al. | |
| 2011/0115622 A1* | 5/2011 | Sadwick | 340/539.16 |

OTHER PUBLICATIONS

Sabripour, Intelligent Energy System, Non-Final Office Action, U.S. Appl. No. 13/345,698, Mail Date: Jan. 17, 2014.
Sabripour, Intelligent Energy System, Final Office Action, U.S. Appl. No. 13/345,698, Mail Date: Mar. 26, 2014.
Zainzinger, An Artificial Intelligence Based Tool for Home Automation Using MATLAB, 6 ppg, 1998 IEEE, Institute of Automation, Vienna, Austria.

* cited by examiner

1700

(1) $\Delta U = Q - W$ (2) $\Delta U = TdS + pdV$ (3) $\eta = 1 - \dfrac{T_C}{T_H}$ (4) $Q_H - Q_C = W_{in}$ (5) $\Delta S = \dfrac{\Delta Q}{T}$

ENVIRONMENTAL CONTROL SYSTEM INCLUDING DISTRIBUTED CONTROL ELEMENTS

CROSS-REFERENCE TO RELATED APPLICATION(S)

This application claims priority to and is a continuation-in-part of co-pending U.S. patent application Ser. No. 13/345,698 filed on Jan. 7, 2012 and entitled "Intelligent Energy System", which claimed priority to and was a non-provisional of provisional patent application No. 61/431,202 filed on Jan. 10, 2011 and entitled "Intelligent Energy System", both of which are incorporated herein by reference in their entireties.

FIELD

The present disclosure is generally related to environmental control systems, such as heating, ventilation, and air-conditioning (HVAC) systems, lighting systems, and other systems that consume energy, and more particularly, to environmental control systems that include distributed control elements.

BACKGROUND

In 2011, the Department of Energy indicated that buildings consume more than 40 quadrillion British Thermal Units (BTUs) per year, accounting for nearly 40 percent of energy use in the United States, for example. In contrast to the amount of energy consumed to achieve comfort levels in buildings, the actual energy needed to maintain human comfort (heating/cooling) and to satisfy other energy needs, such as entertainment, lighting, computing, cooking, domestic hot water, and the like, may be achieved using only a fraction of this amount. A large portion of the energy consumed is wasted through inefficient production and distribution.

HVAC systems in residential and commercial settings may utilize energy control elements that may manage environmental conditions in a limited environment, such as in the vicinity of the thermostat. However, such systems provide limited inputs to the HVAC control system (or may operate as the HVAC controller), resulting in limited system control. As a result, a poorly placed thermostat may result in wasted energy consumption and poor environmental management.

SUMMARY

In certain embodiments, an apparatus may include at least one sensor and a transmitter coupled to the at least one sensor and configured send data to a gateway through a wireless communication link. The apparatus may further include a solar cell configured to provide power to the at least one sensor and the transmitter.

In other certain embodiments, an environmental control system may include a plurality of control elements. At least some of the control elements may include a sensor and a transceiver coupled to the sensor. The transceiver may be configured to send data to a wireless communications link. At least some of the control elements may further include a solar cell configured to provide power to the at least one sensor and the transmitter. The environmental control system may include a gateway configured to receive data from the transceiver and to selectively control a heating, ventilation and air-conditioning (HVAC) system according to the data.

In still other certain embodiments, an apparatus may include a touch screen and a transmitter coupled to the touch screen and configured send data from the touch screen to a gateway through a wireless communication link. The apparatus may further include a solar cell configured to provide power to the touch screen and the transmitter.

BRIEF DESCRIPTION OF THE DRAWINGS

FIG. 17 depicts a set of entropy equations according to certain embodiments.

In the following discussion, the same reference numbers are used in the various embodiments to indicate the same or similar elements.

DETAILED DESCRIPTION OF ILLUSTRATIVE EMBODIMENTS

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a tablet computer, smartphone, personal computer, server, or any other computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage medium or memory device, including instructions that when executed cause a processor to perform the methods.

Embodiments of environmental control systems are described below, which may include heating, air-conditioning and ventilation (HVAC) systems; lighting systems; and other systems that impact the environment of a space, such as an area within a building or structure. The systems may include one or more distributable control elements. The control elements may include a plurality of sensors, a touch-sensitive interface and a transceiver configured to communicate sensor data from the sensors and input data from the touch-sensitive interface to a control system through a wireless communication link. In certain embodiments, the control elements may include a battery and a solar cell, which may supply power to the sensors, the touch-sensitive interface and the transceiver. In certain embodiments, the control elements may be peel-and-stick devices, which may have an adhesive backing configured to attach the control element to a structure, such as a wall. The control elements may automatically communicate with a control system. In certain embodiments, the control elements may communicate with the control system through a gateway.

Figure 1:
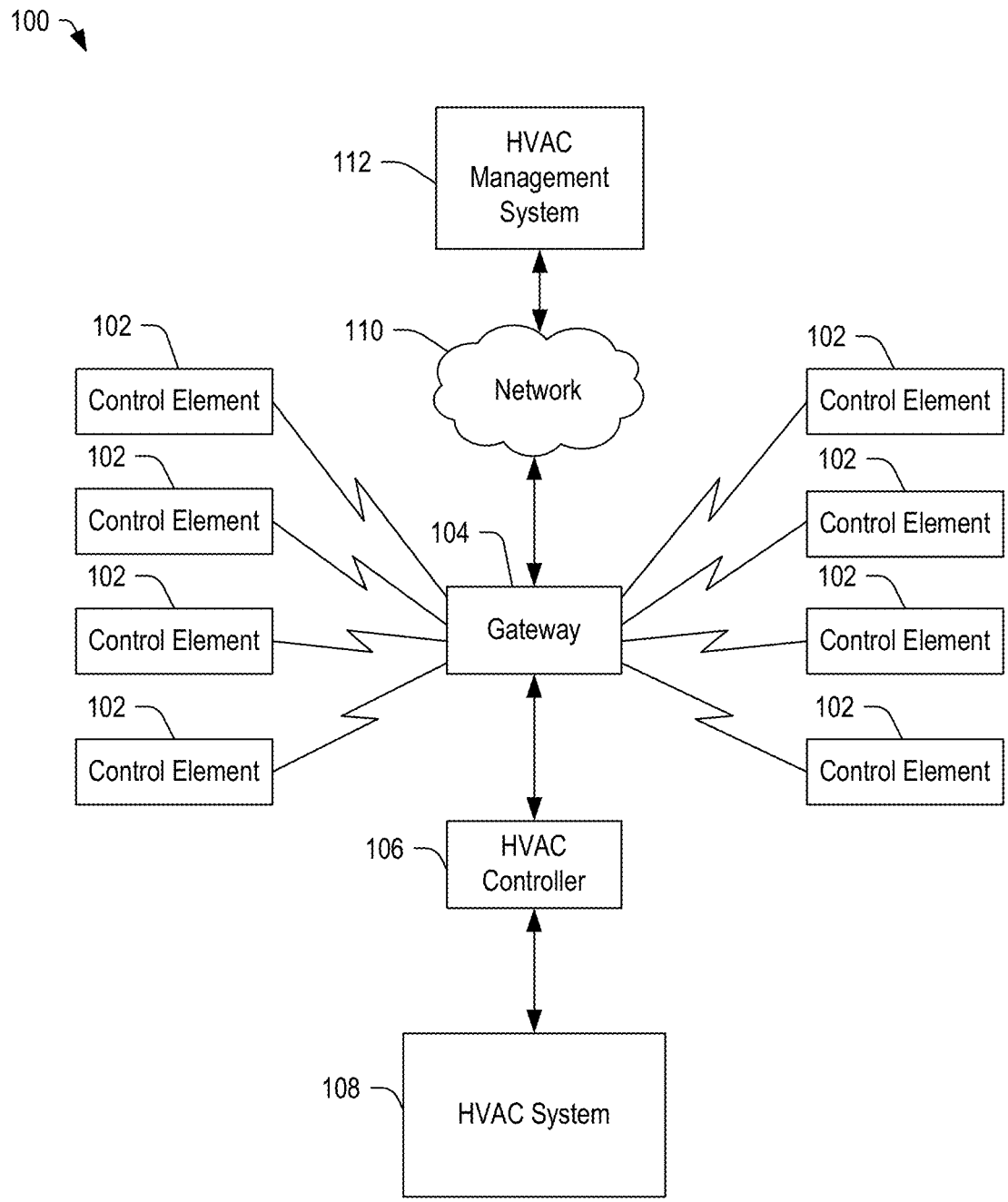
FIG. 1 is a block diagram of an environmental control system including multiple distributed control elements, according to certain embodiments.

FIG. 1 is a block diagram of an environmental control system 100 including multiple distributed control elements 102, according to certain embodiments. The control system 100 may include multiple control elements 102, which may be distributed throughout a structure, such as a home, an office, a building, or any combination thereof. The environmental control system 100 may include a gateway 104, which may communicate with each of the distributed control elements 102 through wireless communication links and which may communicate with an HVAC controller 106 of the structure. The gateway 104 may also communicate with an HVAC management system (intelligent energy engine) 112 through a network 110, such as the Internet. The HVAC controller 106 may receive signals from the HVAC management system 112 via the gateway 104 and may communicate control signals to an HVAC system 108 in response to the signals from the HVAC management system 112.

In certain embodiments, the gateway 104 may be installed in a structure and may be communicatively coupled to the HVAC controller 106. In certain embodiments, the gateway 104 provides wireless connectivity between the distributed control elements 102, the HVAC controller 106, and the HVAC management system 112.

The HVAC controller 106 may include one or more control circuits that control blowers, heaters, air conditioners, humidifiers, and other environmental systems within the structure. In certain embodiments, the gateway 104 may receive user input signals from the control elements and may selectively provide control signals corresponding to the user input signals to the HVAC controller 106 to control the HVAC system 108. In certain embodiment, the gateway 104 may communicate the user input signals to the HVAC management system 112 (instead of or in addition to communicating the user input signals to the HVAC controller 106. In certain embodiments, the HVAC management system 112 may process the user input signals against historical data and provide control signals to the gateway 104, which may communicate the control signals to the HVAC controller 106 to adjust one or more environmental parameters (such as temperature, humidity, other parameters, or any combination thereof) of the HVAC system 108. In certain embodiments, the HVAC controller 106 may be configured to control lighting, ceiling fans, and other electronic devices and systems and may be configured to impact a user's comfort level.

In certain embodiments, the gateway 104 may be installed in a structure and may be communicatively coupled to the HVAC controller 106 and to the network 110. The multiple control elements 102 may be deployed throughout the structure. In certain embodiments, the multiple control elements 102 may operate without a wired connection, deriving power from solar energy and communicating sensor signals and user inputs to the gateway 104 through wireless communication links.

In certain embodiments, the HVAC management system 112 may be implemented as a cloud-based system for efficient data collection and maintenance. The HVAC management system 112 may provide a heuristics-based artificial intelligence (AI) dynamic control configured to bridge the gap between subjective human-comfort parameters and necessary numerical precision needed for optimum heat transfer controls of building systems.

In certain embodiments, the gateway 104 may accumulate specific environmental data from the surrounding building zones (i.e., from the distributed control elements 102), microclimate information, and transmits data (optionally including user input) to the gateway 104. The gateway 104 receives sensor data from the distributed control elements 102 and transfers the data to the HVAC management system 112. The HVAC management system 112 may process the data according to ASHRAE's (formerly the American Society of Heating, Refrigerating and Air Conditioning Engineers) psychrometric human comfort parameters and according to one or more other parameters. The HVAC management system 112 may provide control signals to the gateway 104 to adjust the HVAC system 108, to adjust lighting, to control other parameters, or any combination thereof.

In some embodiments, the environmental control system 100 may operate in a network mode, a standalone mode, a manual mode, or another mode. In the network mode, the gateway 104 may be communicatively coupled to the network 110, such as the Internet. The gateway 104 may send sensor and user data to the HVAC management system 112, may receive control signals (in response to the sensor and user data) from the HVAC management system 112, and may provide the control signals to the HVAC controller 106.

In a standalone mode, the gateway 104 may not be coupled to the network 110. In this mode, the gateway 104 may provide state-optimized control signals to the HVAC controller 106 in response to sensor data, user inputs, or a combination thereof.

In a manual override mode, the gateway 104 and the distributed control elements 102 may utilize a fixed proportional-Integral-Differential (PID) ROM-booted (read-only memory booted) control algorithm, which may be similar to operation of a traditional thermostat. This manual override mode may ensure that system control of the HVAC systems 108 can still be maintained under worst case conditions and in response to user request for manual/rapid control of the system 100.

In some embodiments, the gateway 104, the HVAC management system 112 and the distributed control elements 102 provide elements that can convert an existing HVAC system into a smart HVAC system, which may achieve user comfort with enhanced energy efficiency. Additionally, because each of the distributed control elements 102 may be communicatively coupled to the gateway 104 without the need for wiring for power or communication, the distributed control elements 102 may be positioned in a variety of locations throughout the plant (or structure), preferably in a position to receive sufficient light to power its solar cell.

Figure 2A:
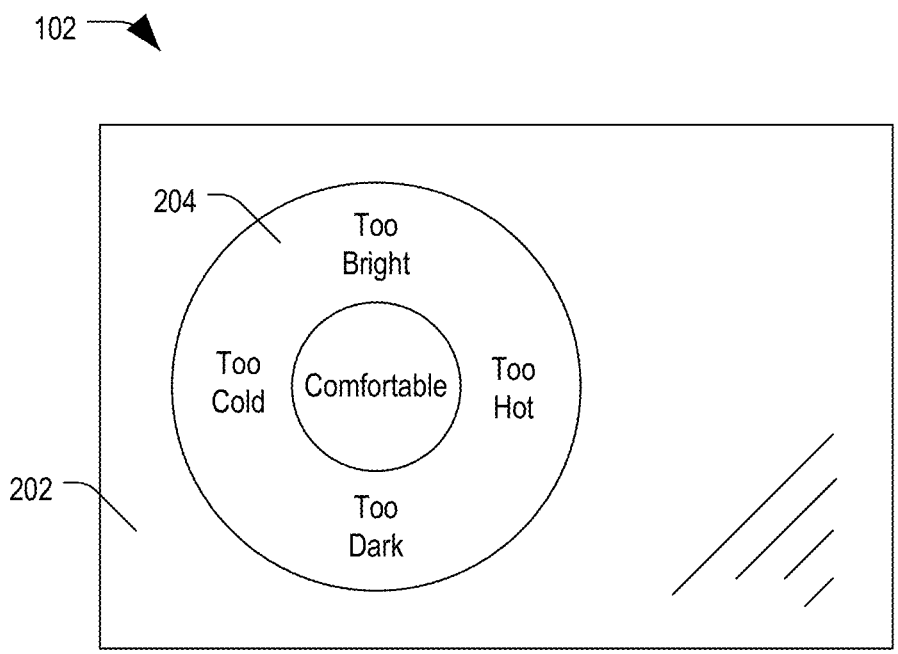
FIGS. 2A and 2B are diagrams of a distributed control element according to certain embodiments.
Figure 2B:
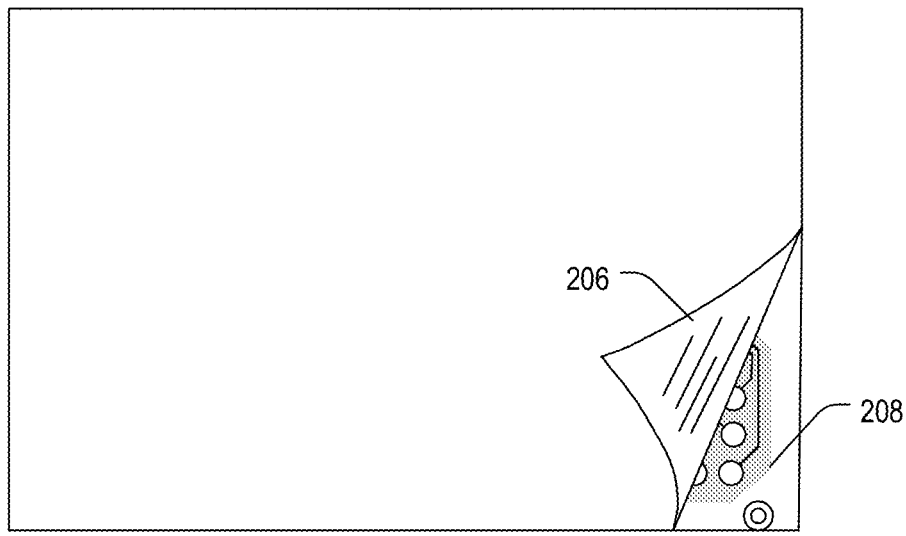

FIGS. 2A and 2B are diagrams of a distributed control element 102 according to certain embodiments. FIG. 2A depicts a front-view of the distributed control element 102, while FIG. 2B depicts a back-side view of the distributed control element 102 with a portion of a peel-away cover 206 partially peeled back.

The distributed control element 102 may include a touch-sensitive interface 202, which may include a touch-control feature 204, which may be accessed by a user to provide user input that may affect the HVAC system 108. In certain embodiments, a portion of the distributed control element 102 may include the touch-sensitive interface and another portion of the distributed control element 102 may include a solar cell, which may provide power to the distributed control element.

In certain embodiments, the distributed control element 102 may be formed from a flexible or rigid circuit substrate, which may be mounted to a structure, such as a wall, using an adhesive backing. The distributed control element 102 may include a peel-and-stick adhesive backing that includes a peel-away cover 206, which may be removed to expose an adhesive backing, which may be pressed against the structure to attach the distributed control element 102 to the structure. The distributed control element 102 may include circuitry 208, which is partially depicted in FIG. 2B.

In certain embodiments, the distributed control element 102 may include a solar cell to generate electricity from available light, a battery to store electrical charge from the solar cell, the touch-sensitive interface 202 including the touch control feature 204. In the illustrated example, the touch control feature 204 may be a "wheel"-shaped control element representing a circular gradient between various comfort states: "Too Bright", "Too Dark", "Too Cold", "Too Hot", or "Comfortable" (i.e., just right). The distributed control element may also include a variety of sensors, such as temperature sensors, light sensors, humidity sensors, and so on.

In certain embodiments, a user may interact with the touch-sensitive interface to provide input corresponding to the user's general comfort level expressed in terms of light levels and temperature levels. In certain embodiments, the user input may be sent to the HVAC management system 112 together with data from various sensors associated with the distributed control element 102. The HVAC management system 112 may process the received data and may send control signals to the HVAC controller 106 through the network 110 and the gateway 104 to make adjustments to various parameters (such as humidity, temperature, fan speed, other parameters, or any combination thereof) of the HVAC system 108.

Figure 3:
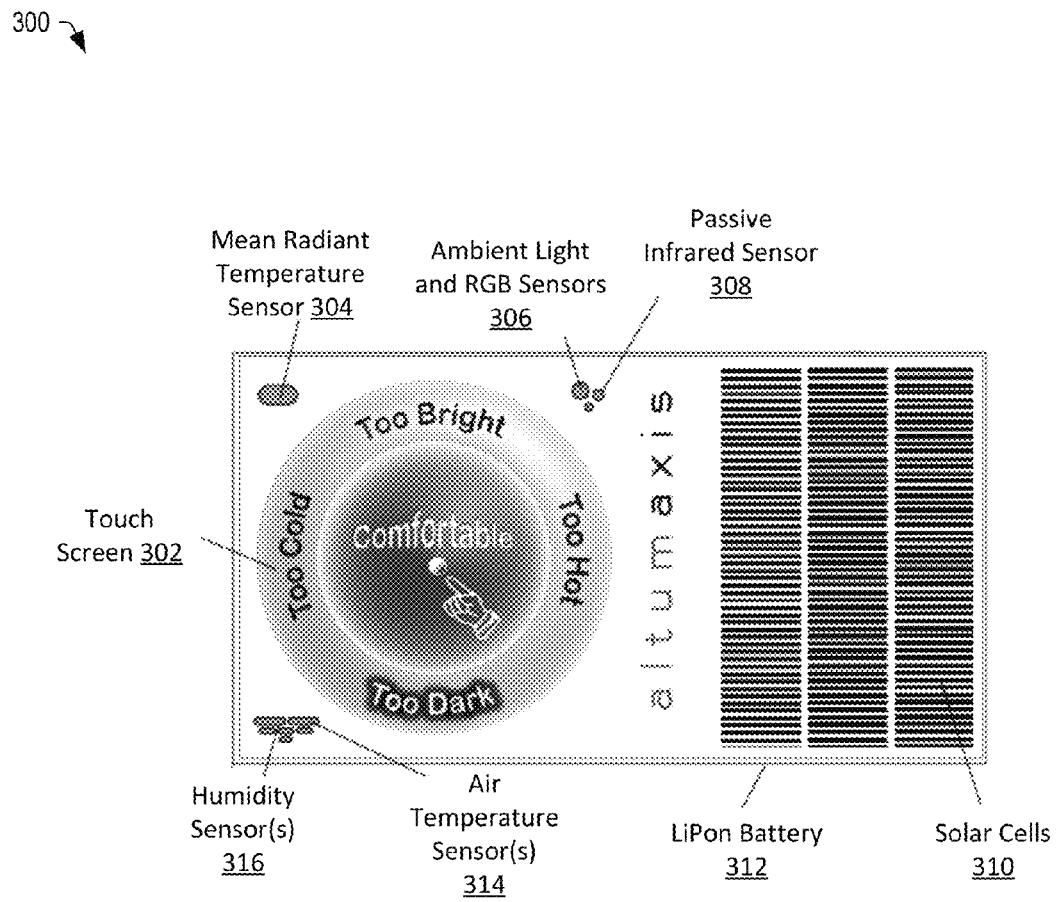
FIG. 3 is a diagram of a distributed control element according to certain embodiments.

FIG. 3 is a diagram of a distributed control element 300 according to certain embodiments. The distributed control element 300 includes a touch screen 302 accessible by a user to adjust comfort settings of an HVAC system, such as the HVAC system 108. The distributed control element 300 may further include a mean radiant temperature sensor 304, ambient light and red/green/blue (RGB) sensors 306, and a passive infrared sensor 308. The distributed control element 300 may also include one or more solar cells 310, a battery 312 (such as a lithium ion battery, a lithium phosphorous oxynitride (LiPon) battery, or another rechargeable type of battery), one or more air temperature sensors 314, and one or more humidity sensors 316.

In certain embodiments, the distributed control element 300 may be a wireless, energy harvesting, sensor node with a human user interface (touch screen 302) that may be configured to communicate with an HVAC management system 112, which may be a cloud-based control system designed to determine and maintain human comfort factors, instead of just managing the ambient air and the humidity parameters of the particular environment.

In certain embodiments, the distributed control element 300 may be one of a plurality of such control elements distributed throughout a particular plant, such as a home or business. The distributed control element 300 may be part of an environmental control system, such as the control system 100 (in FIG. 1), and may communicate wirelessly with the gateway 104 to provide sensor data and user inputs to at least one of the HVAC controller 106 and the HVAC management system 112.

In certain embodiments, the distributed control element 300 may provide a linguistic, touch-interface 302 that keeps humans in the loop, has low initial cost, and low operating costs. The distributed control element 300 may be wireless, and may harvest energy from ambient light in order to provide distributed control and measurement capability with low maintenance and without having to add wiring. By measuring light, temperature, humidity, etc., the distributed control element 300 may measure multiple parameters affecting human comfort—not just ambient temperature.

In some embodiments, the control element 300 serves as an input to the energy management system 112 and to the HVAC controller 106. The control element 300 may be powered through an energy-harvesting power system that uses solar cells that charge a rechargeable battery 312. In some embodiments, the rechargeable battery 312 may include a 1 mA-hr LiPon battery as well as a single coin cell lithium battery for back-up power to the display. The control element 300 may include a graphical user interface (GUI) displayed on a touch-interface 302. The sensors may measure various parameters for system input including averaged radiant temperature of the environment; ambient air temperature; sensor self-temperature; ambient light and RGB color; relative humidity; passive infrared occupancy senor; and occupant touch frequency and multipoint input data.

In some embodiments, the user interface is through the touch screen 302, which may be capacitive. The control element 300 may enter an idle, low-power mode and may wake periodically to measure various parameters, to communicate the sensor data to the gateway 104, and then to return to the idle, low-power mode. In some embodiments, the control element 300 may enter an operating state when the touch interface 302 is touched. Depending on where the user touches on the touch screen 302 or how the user moves the sliding scale, such as by touching and dragging across the touch screen 302, the user can indicate his or her comfort level (i.e., if he or she is too hot, too cold, and whether the room is too bright, or too dark).

The data obtained with these measurements may be transmitted wirelessly to the gateway 104. A block diagram of the control element is shown below. Included in the diagram are all of the sensors and the power system.

Figure 4:
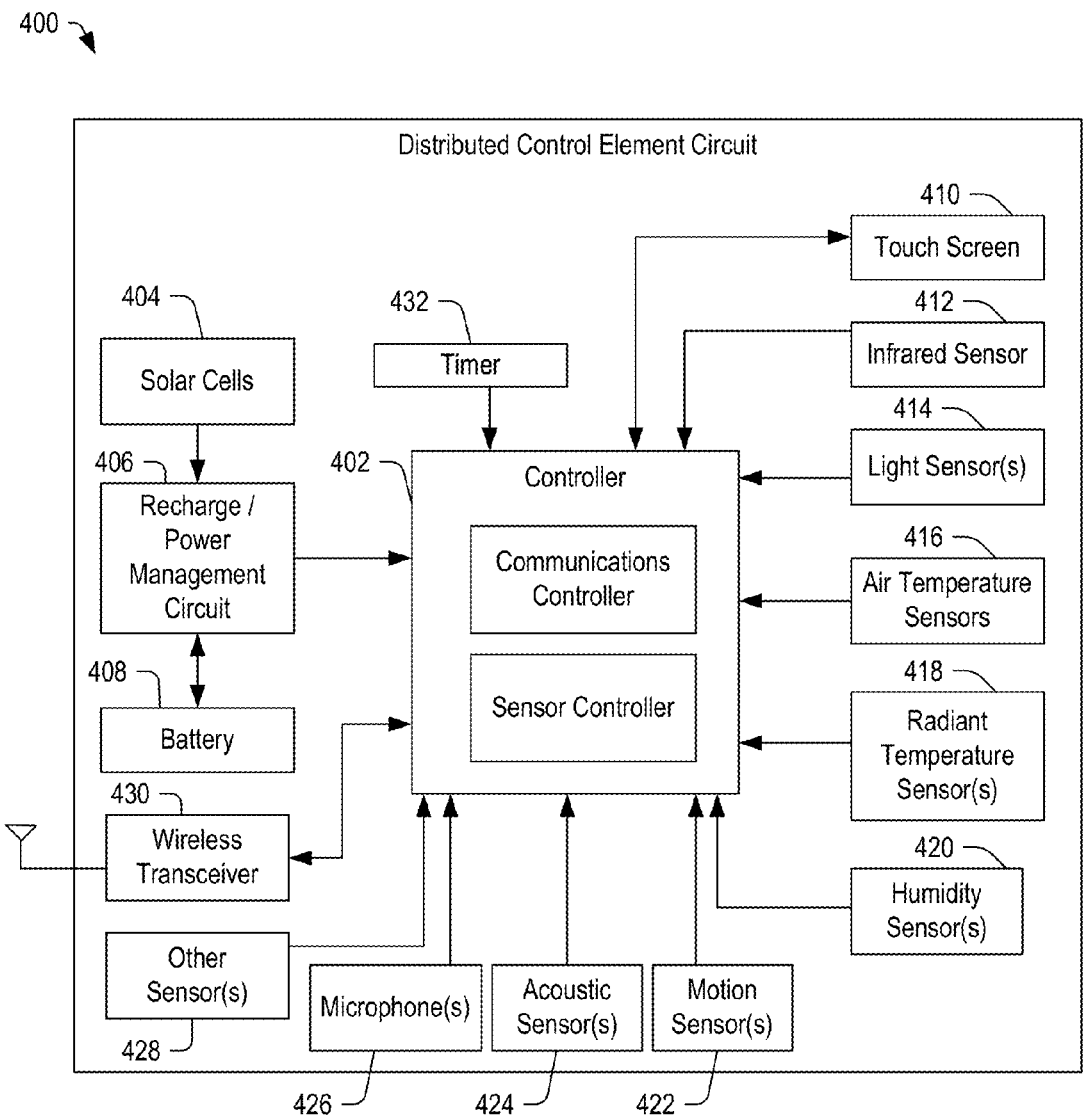
FIG. 4 is a block diagram of a circuit of a distributed control element circuit according to certain embodiments.

FIG. 4 is a block diagram of a circuit 400 of a distributed control element circuit according to certain embodiments. The circuit 400 may be part of the distributed control element 102 in FIGS. 1, 2A and 2B or of the distributed control element 300 in FIG. 3. The circuit 400 may include a controller 402, which may be implemented as a microcontroller unit (MCU) and which may include a communication controller and a sensor controller. The circuit 400 may further include one or more solar cells 404, which may be coupled to a recharge/power management circuit 406. The recharge/power management circuit 406 may provide current from the one or more solar cells 404 to a battery 408 and may provide power to the controller 402 and to other components of the distributed control element circuit 400.

The circuit 400 may include a touch screen 410 and associated circuitry coupled to the controller 402. The circuit 400 may further include one or more infrared sensors 412, one or more light sensors 414, one or more air temperature sensors 416, one or more radiant temperature sensors 418, one or more humidity sensors 420, one or more motion sensors 422, one or more acoustic sensors 424, one or more microphones 426, other sensors 428, or any combination thereof. Each of the sensors 414, 416, 418, 420, 422, 424, and 428 and the microphones 426 may be coupled to the controller 402. The circuit 400 may also include a wireless transceiver 430 coupled to the controller 402. The circuit 400 may also include a timer 432.

In some embodiments, the motion sensor 422 may detect movement in an area proximate to the circuit 400, which movement may be indicative of an occupant. The motion sensor 422 may detect movement and generate a signal to the MCU 402, causing the MCU to wake up from a low power mode, such as a sleep or idle mode.

In certain embodiments, the controller 402 may enter a sleep or idle mode and may wake up in response to user interaction with the touch screen 410 or may wake up periodically (in response to a signal from the timer 432) to capture measurement data and to transmit the measurement data to the gateway 104. In some embodiments, the controller 402 may wake up to capture radiant temperature parameters every 30 minutes, ambient temperature every five minutes, self-temperature measurements every 30 minutes, humidity every 30 minutes, PIR every 500 mS, and user input on demand.

In operation, the controller 402 may remain in a lowest available sleep mode (idle or low power mode) during the inactive interval. In certain embodiments, only the timer 432 (such as a real-time clock (RTC)) and a PIR circuit, which may be part of the sensor controller, may remain active during the idle period. To conserve power, other circuit elements and peripherals of the circuit 400 may enter a low power state or be turned off during idle periods. Upon wake up, the controller 402 may activate the relevant sensor and capture the measurement.

In certain embodiments, the humidity sensor 420 may be powered using a general purpose input/output (I/O) of the controller 402. When the interval for humidity measurements expires, the controller 402 may turn the humidity sensor "ON" and then commence with the measurement. Once the measurement is complete, the controller 402 may turn off the sensor and then return to an idle state. By turning on and off components as needed, the circuit 400 may operate using solar energy and stored power, reducing the overall average power consumption.

In some embodiments, the controller 402 may be implemented using an MCU that has multiple low power modes, each of which provide a different level of current consumption. There may be some cases where the MCU may be placed in one low power mode while a particular sensor is measuring the parameter and may return to another low-power state thereafter.

In some embodiments, the circuit 400 may enter an initial state when the system is powered on for the first time. In order to start the installation process, a touch sequence may be activated on the touch screen 310 to enter the installation mode. The touch screen may include a GUI that may show several parameters, such as an illuminance and luminous emittance value (Lux value) from the solar cells and light sensors as well as radiant temperature. In some embodiments, the control element 102 may be placed opposite a largest wall surface that has the largest thermal mass for the radiant sensor measurement. After the particular area within the zone has been determined (i.e. a specific hallway or room), the elements identified will be the key elements that will be used to determine the placement of the sensor within the zone. At this time, the controller 402 and any integrated peripherals may be configured for their default operation. For example, the controller 402 may initialize system clocks; may configure general purpose I/Os for the correct default state after power up (display, power controls, energy harvester, etc.); may configure a serial peripheral interfaces (SPIs) for the wireless transceiver and for the touch screen controller; may configure Inter-integrated circuits ($I^2Cs$) for the humidity sensor, for the ambient light sensor, and for the radiant temperature sensor; may configure an analog-to-digital converter (ADC) for the passive infrared (PIR) sensor; and may measure voltages of the back-up battery and solar cell.

In some embodiments, the distributed control elements 402 may be placed in selected locations to maximize the solar energy that strikes the surface of the solar cells. In addition, placement of the sensor node should maintain accurate sensor measurements of the ambient conditions such as light, temperature and humidity as well as the performance of the radiant temperature measurements and the PIR occupancy sensor. In order to determine the optimal placement of the sensor, the controller 402 may run a built-in test during the installation process, which built-in test may attempt to measure and optimize all of the parameters while maintaining sufficient energy to charge the system. In certain embodiments, accurate sensor measurements may be the paramount concern, in which case total solar energy to the cells may be sacrificed in favor of accurate sensor measurements.

In some embodiments, the distributed control element 102 (including circuit 400) may be positioned to obtain the best possible values for all parameters while maintaining the connection to the gateway 104. In some embodiments, the placement of the control element 102 may achieve a wall temperature (radiant temperature) measurement that provides an accurate representation of the thermal properties of the wall being measured. A signal strength measurement (by the wireless transceiver 430) may provide an indication of the proximity of the circuit 400 to the gateway 104. An ambient light measurement may be used to maximize the amount of light striking the surface of the solar cell, which may be a direct correlation to the amount of charge time. Once the location of the sensor has been determined, then the RF power of the circuit 400 can be set. After selecting "OK," the circuit 400 may start an algorithm that sends a signal including a received signal strength indicator (RSSI) to the gateway 104 and the gateway 104 may verify the RSSI value on its end. A new value of the RF output power of the circuit 400 can be determined to reduce the overall current consumption by the circuit 400 in order to reduce the load. The new value may be sent to the circuit 400 to program the RF transceiver registers and the algorithm may be tried again to confirm the settings. Once a suitable combination of packet error rate (PER) along with minimum signal strength has been determined, the system may transition to normal operating mode and will be ready to use.

During operation, the circuit 400 may be responsible for the overall measurement of the sensors including: radiant temperature, ambient temperature, humidity, passive infrared and ambient light. The sensor will remain in the lowest power sleep state while not performing any measurements. After either the default time-out period or the time-out period defined by the gateway, the node will take the defined measurement for that period. Each sensor may have its own defined interval and may not be measured at each wake event. In some embodiments, the wake interval used for the humidity and temperature measurements may be configured dynamically. For example, the circuit 400 may have a default timing interval for wakeup and measurement it is deployed, but the HVAC management system 112 may send a signal to the gateway 104, which may communicate a timing adjustment to the circuit 400 to adjust the wake interval of the circuit 400, enabling lower power operation of the sensors (in some instances) by decreasing the average current consumed by the circuit 400 by increasing the time interval between transmissions. The interval will be a variable parameter that can be updated in the firmware through a command issued from the HVAC management system 112 through the gateway 104 and to the circuit 400.

Figure 5A:
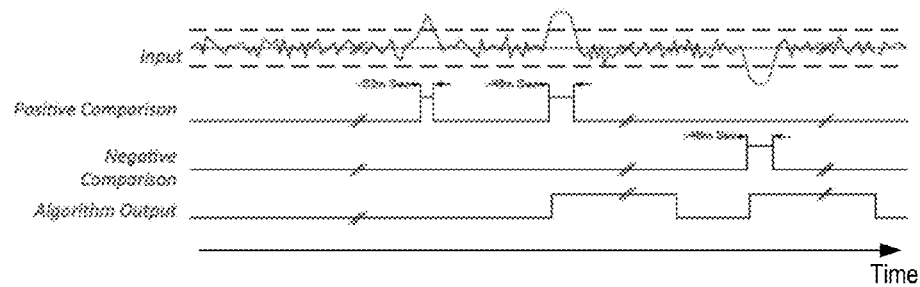
FIGS. 5A-5C are timing diagrams of a startup sequence, a calibration routine, and a pulse signature detection routine, according to certain embodiments.
Figure 5B:
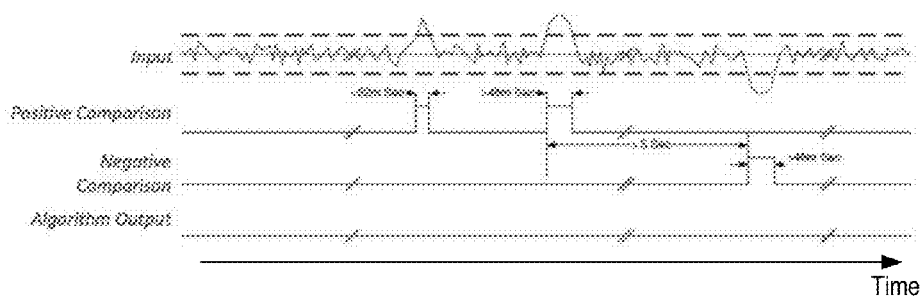
Figure 5C:
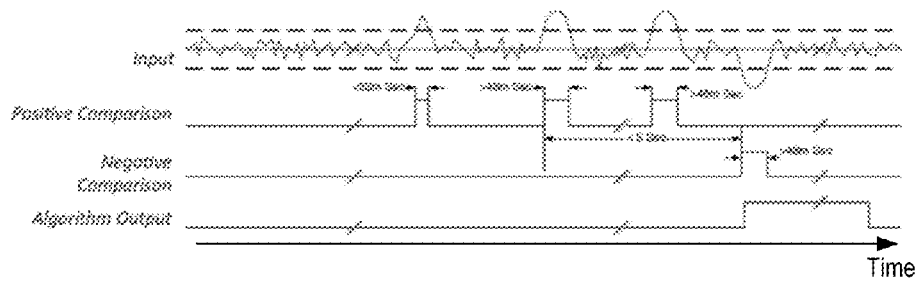

FIGS. 5A-5C are timing diagrams of a startup sequence, a calibration routine, and a pulse signature detection routine, according to certain embodiments. FIG. 5A depicts a graph 500 of a first portion of the startup sequence, which may be configured to last for a period of time, such as thirty seconds. During that first portion, wakeup functions relating to the passive infrared (PIR) are performed. Additionally, the controller 402 may test to ensure that a certain glitch width is seen before setting the occupant detection threshold. The digital signal processing deglitch time may be related to a period of time when an analog-to-digital converter (ADC) threshold of the controller 402 has been crossed and compared to a predefined time-out period of 32 ms. A signal width less than 32 ms period may be deglitched as a zero, while a signal width of greater than 48 ms may be deglitched as a 1. The routine depicted in graph 510 implements a single pulse mode that readies the circuit 400 to recognize different pulse signatures and that will trigger the algorithm output signal to produce a pulse of a pre-determined duration in response to toggling of either the positive comparison or the negative comparison signal.

FIG. 5B depicts a graph 520 of the first portion of the startup sequence, which may be configured to last for the period of time. In graph 520, a pulse recognition it is noted that the time period between the rising edge of the positive comparison signal pulse and a rising edge of the negative comparison input pulse is approximately five seconds. In a dual pulse mode, the circuit 400 looks for two pulses from opposite comparison to occur within a timeout window of five second. If the adjacent pulses fall outside of the time window (i.e., greater than five second), the algorithm output signal will not produce a pulse, and the pulse recognition routine will be restarted.

In FIG. 5C, the graph 530 depicts the two pulses from opposite comparison (i.e., positive comparison and negative comparison) within the five second window. In this instance, the negative comparison pulse is detected within the time window, and the algorithm output signal produces a pulse of a pre-determined duration in response to detecting both pulses within the time window.

Figure 6:
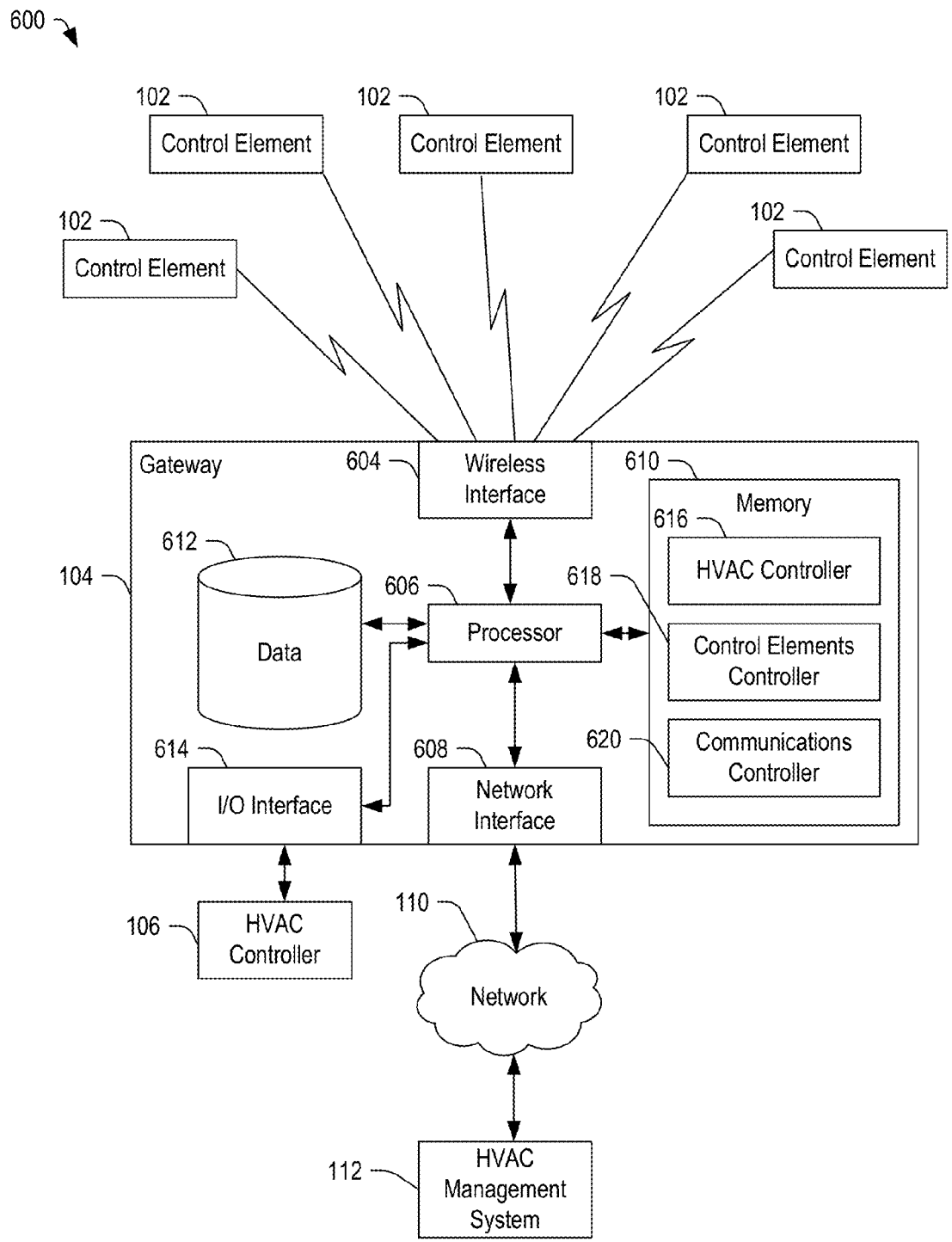
FIG. 6 is a block diagram of an environmental control system including a gateway configured to communicate with distributed control elements according to certain embodiments.

FIG. 6 is a block diagram of an environmental control system 600 including a gateway 104 configured to communicate with distributed control elements 102 (wirelessly) according to certain embodiments. The gateway 104 may communicate with HVAC management system 112 through the network 110. The gateway 104 may also communicate with the HVAC system 108 of a particular structure through the HVAC controller 106.

The gateway 104 may include a wireless interface 604 configured to communicate wirelessly with the control elements 102. The gateway 104 may further include a processor 606 coupled to the wireless interface 604 and to a network interface 608, which may be communicatively coupled to the network 110. The processor 606 may be coupled to a memory 610, a database 612, and an input/output (I/O) interface 614. The I/O interface 614 may be coupled to the HVAC controller 106 through a wired or wireless communication link. In some embodiments, the database 612 may be stored in the memory 610.

The memory 610 may include HVAC controller instructions 616 that, when executed by the processor 606, cause the processor 606 to communicate control signals to the HVAC controller 106. The memory 610 may also include control elements controller instructions 618 that, when executed, cause the processor 606 to communicate control signals to the distributed control elements 102. Further, the memory 610 may include communications controller instructions 620 that, when executed, cause the processor 606 to send data or commands to or receive data from the distributed control elements, the HVAC management system 112, or the HVAC controller 106.

In certain embodiments, the gateway 104 receives data from one or more of a plurality of the control elements 102. The data may include measurement data of one or more environmental parameters, user input data, or any combination thereof. The gateway 104 may receive the data in response to a request sent from the gateway 104 to one or more of the control elements 102. In certain embodiments, the gateway 104 may receive the data periodically or in response to a user input received at one of the control elements 102.

The gateway 104 may send at least a portion of the data to the HVAC management system 112, may receive a control signal from the HVAC management system 112 in response to sending the portion, and may provide a signal to the HVAC controller 106 in response to the control signal. The signal provided to the HVAC controller 106 may include a command or control instruction to control operation of the HVAC system 108.

In some embodiments, the gateway 104 may be unable to communicate with the HVAC management system 112. In this example, the gateway 104 may execute the HVAC controller instructions 616 to control operation of the HVAC system 108 in response to the data from the control elements 102.

In some embodiments, it may be desirable to update firmware associated with one or more of the control elements 102. Since there are no wired connections between the gateway 104 and the control elements 102, the gateway 104 may provide Over-the-Air Programming (OTAP). Each control element 102 may be capable of updating its firmware, restarting and then reconnecting (communicatively) to the gateway 104. In some embodiments, prior to updating the firmware, the gateway 104 may request and store a snapshot of all the operating parameters of the control element 102 by sending a signal to the control elements 102 and receiving the snapshot in response thereto. The gateway 104 may store the snapshot prior to erasing the flash and may then restore all of the parameters after the firmware has been modified.

Figure 7:
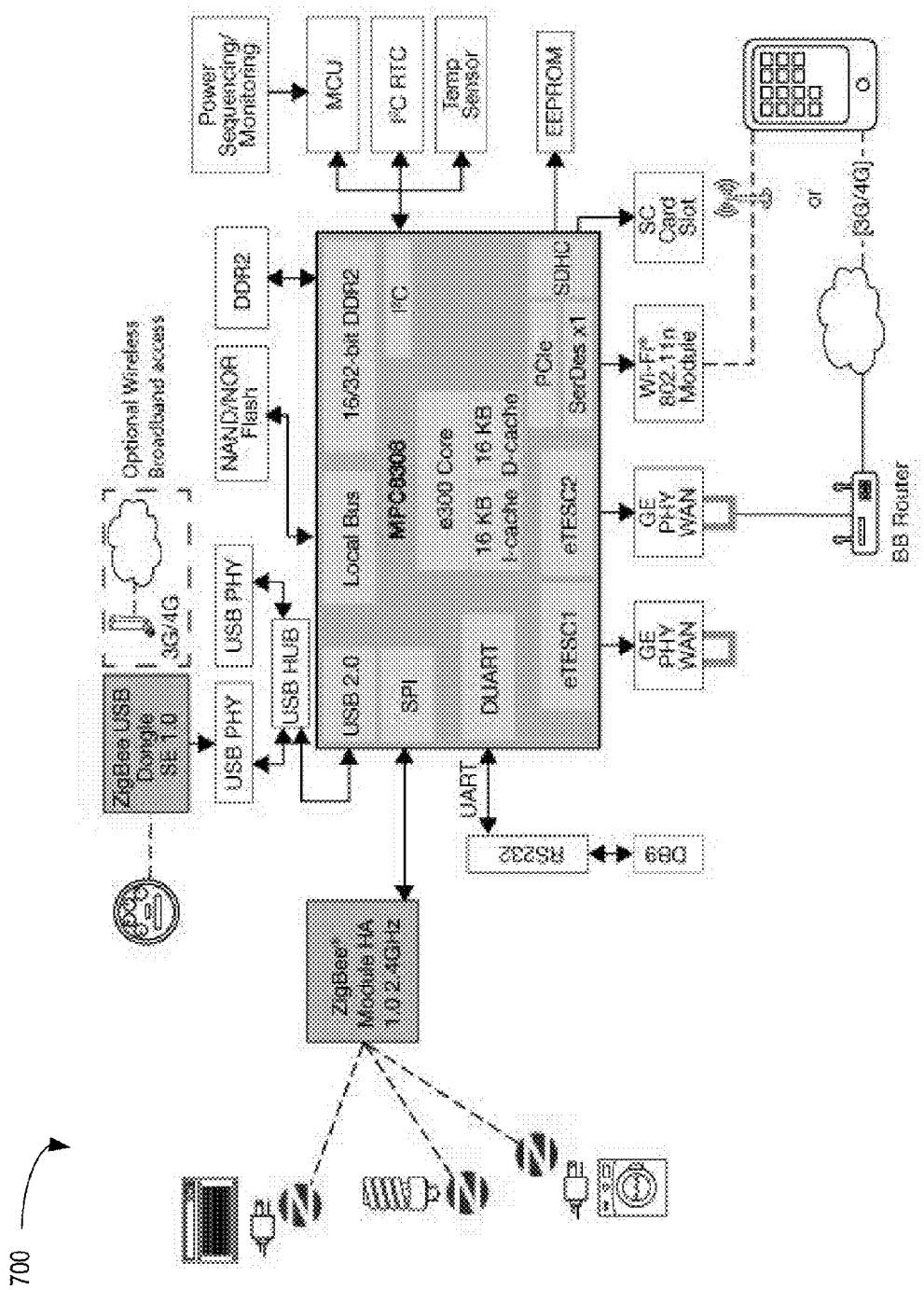
FIG. 7 is a block diagram of a gateway for use with an environmental control system according to certain embodiments.

FIG. 7 is a block diagram of a gateway 700 for use with an environmental control system according to certain embodiments. The gateway 700 may be an embodiment of the gateway 104 in FIGS. 1-4 and 6 above. The gateway 104 may operate as a bridge between the wireless control elements 102 and the HVAC controller 106. Further, the gateway 104 may control the automation systems deployed within the home or structure. In addition, various interfaces may be provided as a means for expansion of the capabilities. For example, the Zigbee Smart Energy (SE) interface may be included to allow communication with utility systems for power monitoring.

The gateway 700 may include a microprocessor core including cache memory. The gateway 700 may include a serial peripheral interface (SPI) which may couple the core to one or more ZigBee® enabled devices, such as lights, washing machines, microwaves, televisions, and various appliances and devices via a ZigBee® module. The gateway 700 may further include a Universal Serial Bus (USB) interface configured to couple to a USB hub, USB physical layers, and optional ZigBee® USB dongle, which may permit communication between the gateway 700 and a utility meter.

The gateway 700 may include a local bus, which may be coupled to a memory device, such as a flash memory. The gateway 700 may also include a double data rate synchronous dynamic random-access memory (DDR2) interface configured to couple to a DDR2 device. The gateway 700 may include an Inter-Integrated circuit (I2C) bus coupled to an I2C real-time clock (RTC), a temperature sensor, and an MCU, which may be coupled to a power sequencing/monitoring circuit. The gateway 700 may further includes a secure digital high capacity (SDHC) interface coupled to the electrically erasable programmable read only memory (EEPROM) or to a standard capacity card slot. The gateway 700 may also include a Peripheral Component Interconnect Express (PCIe) interface and a serializer/deserializer (SerDes×1) which may communicate via a short-range wireless communication with an external device, such as a smart phone. The gateway may further include network interfaces (eTESC1 and eTESC2) which may communicate with a router through a network connection. The gateway 700 may further include a dual universal asynchronous receiver/transmitter (DUART) which may communicate with a DB9 or RS 232 connector.

In certain embodiments, the gateway 700 may include a core processor that may execute an operating system, such as Linux, and the various operations may be controlled based on one or more Linux applications. The gateway 700 may receive data from one or more sensor nodes, such as control elements 102 or other sensor nodes, and may send the data to the HVAC management system 112. In addition, the gateway 700 may receive processed data, instructions, or any combination thereof from the HVAC management system 112 and may communicate with actuators, controllers or other nodes to turn on or off lighting, and to control HVAC and other home automation systems.

In certain embodiments, upon power up, the gateway 700 may register with the HVAC management system 112. The gateway 104 may pull data from the UART connected wireless access point (via CDC class, which is already part of the kernel build). The gateway 700 may concatenate any data from the multiple control elements 102 or other sensor nodes, if required. In some embodiments, the data may be stored until sent off to the server. The gateway 700 may capture snapshot data from the third party home controller (current state of all connected devices for lighting, HVAC, shades etc.). The gateway 700 may format the data to be sent to the HVAC management system 112 and send it through the interface if connected to the ISP (WAN if operating as the home router or WiFi if connected to another router). The gateway 700 may concatenate snapshot data with the current measured values. The gateway 700 may also store the data as a text file. In some embodiments, the gateway 700 may receive data from the server and pass it to a third party controller (LAN port) or to one or more actuators. In certain embodiments, the gateway 700 may implement manual thermostat functions based on the measured values from the control elements 102. The gateway 700 may send an alert to the HVAC management system 112, to a user device, or both, if the gateway 700 detects an issue with one of the control elements 102. The gateway 700 may pull data from the Zigbee® module and pass the data to the HVAC management system 112. The gateway 700 may provide software update method from the HVAC management system 112 to be able to update the gateway 104 and to provide firmware update capability to the controller elements 102. In some embodiments, the gateway 700 may provide a web application interface through which a customer may connect to the gateway 700 to see system operation and configuration information.

Figure 8:
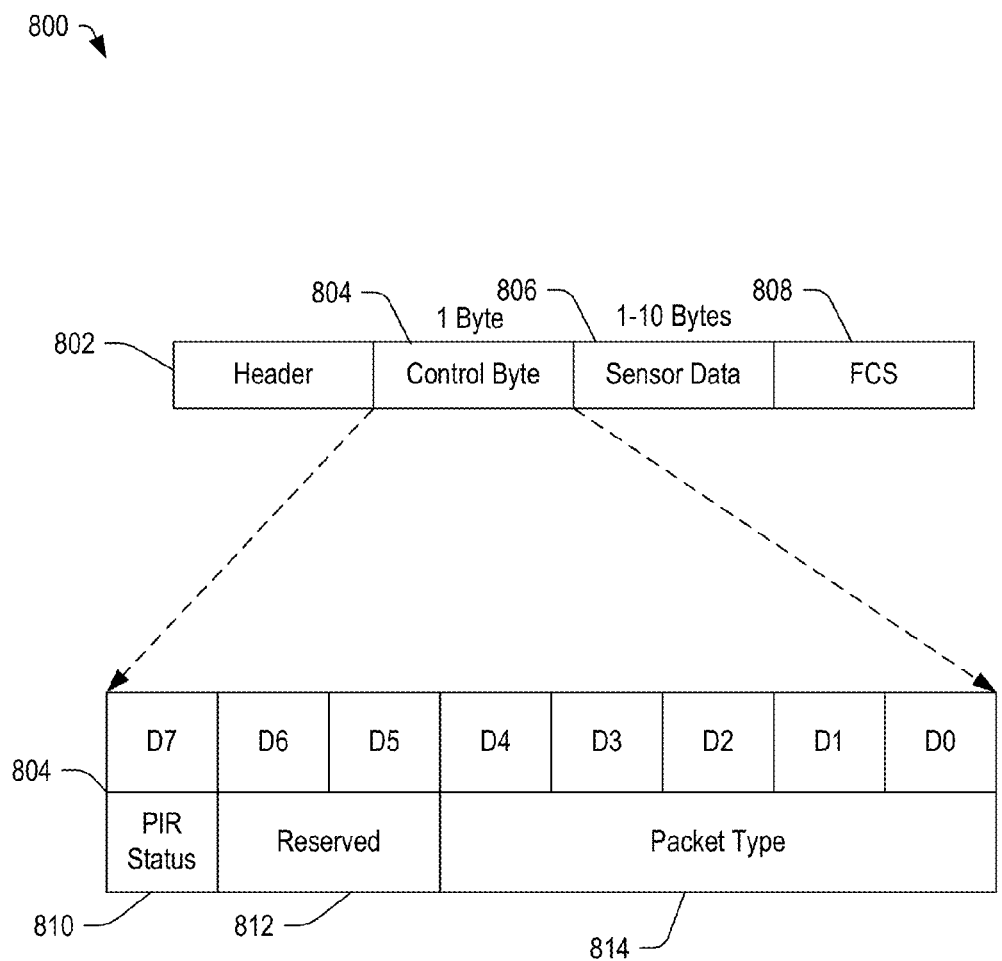
FIG. 8 is a block diagram of a packet format for data transmission between sensor nodes and a gateway of an environmental control system according to certain embodiments.

FIG. 8 is a block diagram of a packet format 800 for data transmission between sensor nodes and a gateway of an environmental control system according to certain embodiments. The packet 800 may include a header 802, a control byte field 804 (which may include 1 byte of data), a payload field 806 (which may include 1-10 bytes of sensor data), and a frame check sequence (FCS) 808. The control byte field 804 may include a PIR status bit 810, two reserved bits 812, and five bits indicating the packet type.

In certain embodiments, the control element 102 may assemble data from multiple sensors and assemble the data into a suitable packet for wireless transmission to the gateway 104. The wireless protocol handles all of the low level functions that enable each of the control elements 102 (or nodes) to join the network provided by the gateway 104 and to pass the data to the gateway 104 through the network. Each packet may include a control byte that identifies they type of data contained within the packet and the data payload. The data in the payload may include at least the high byte and low byte of each measured value according the ordering of the packet data outlined. The packet formats are discussed below with respect to FIGS. 9A-9D and FIGS. 10A-10C.

Figure 9A:
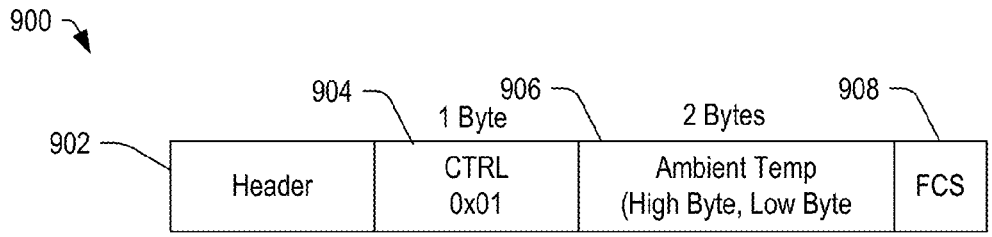
FIGS. 9A-9D are packet formats for ambient temperature, radiant temperature, ambient light, and power levels respectively, according to certain embodiments.

FIGS. 9A-9D are packet formats for ambient temperature, radiant temperature, ambient light, and power levels respectively, according to certain embodiments. The packet formats may be packets sent by control elements 102 to the gateway 104 (or 700 in FIG. 7). In FIG. 9A, the ambient temperature packet (generally indicated at 900) includes a header field 902, a control byte 904 (0x01), an ambient temperature payload 906 including a high byte and a low byte, and the FCS 908.

Figure 9B:
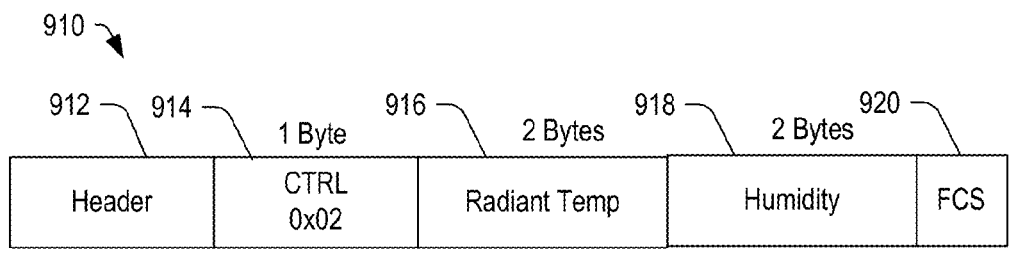

In FIG. 9B, the radiant temperature packet is shown and generally indicated at 910. The packet 910 includes a header 912, a control byte 914 (0x02), a radiant temperature field 916 (2 bytes), a humidity field 918 (2 bytes), and the FCS 920.

Figure 9C:
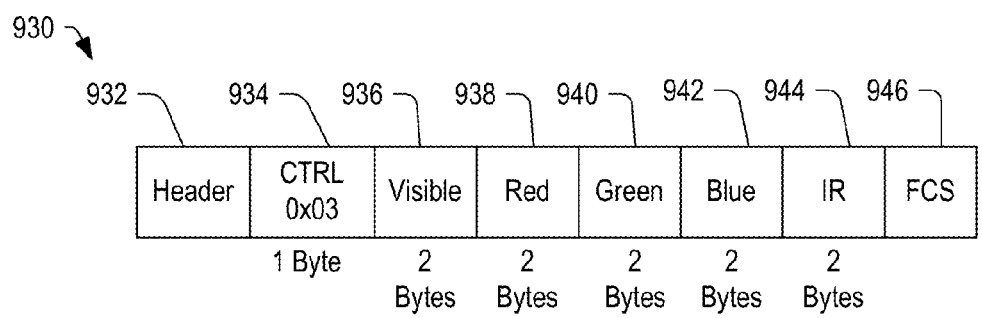

In FIG. 9C, the ambient light packet is shown and generally indicated at 930. The packet 930 includes a header 932, a control byte 934 (0x03), a visible light field 936 (2 bytes), a red light field 938 (2 Bytes), a green light field 940 (2 bytes), a blue light field 942 (2 bytes), an infrared light field 944 (2 bytes), and an FCS 946.

Figure 9D:
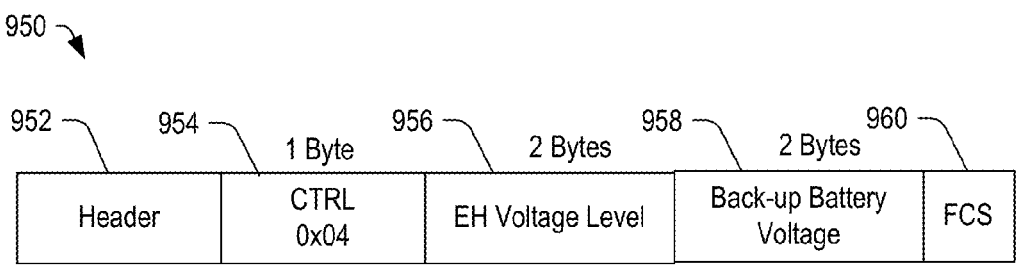

In FIG. 9D, the system power level packet is shown and generally indicated at 950. The packet 950 includes a header 952, a control byte 954 (0x04), an energy harvesting (EH) voltage level 956 (2 bytes), a back-up battery voltage 958 (2 bytes), and an FCS 960.

Figure 10A:
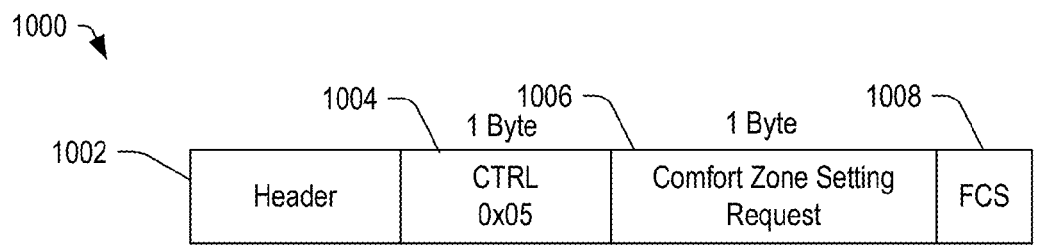
FIGS. 10A-10C are packet formats for comfort zone settings, acknowledgment, and negative acknowledgment respectively, according to certain embodiments.
Figure 10B:
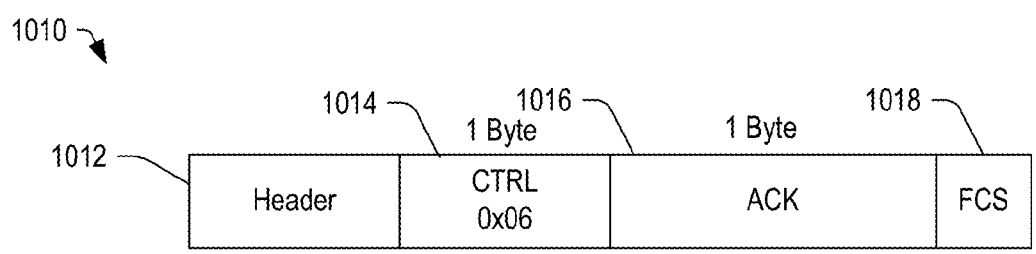
Figure 10C:
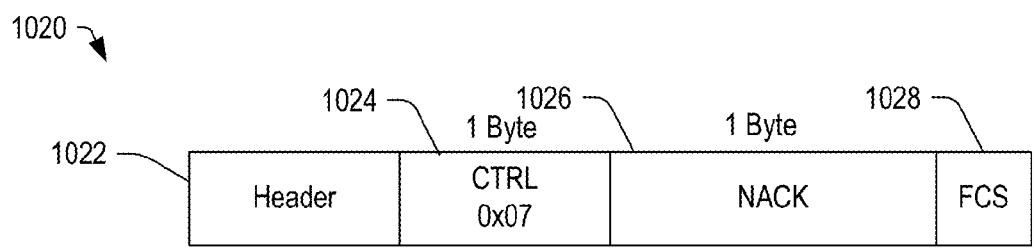

FIGS. 10A-10C are packet formats for comfort zone settings, acknowledgment, and negative acknowledgment respectively, according to certain embodiments. The packet formats may be packets sent by control elements 102 to the gateway 104 (or 700 in FIG. 7). In FIG. 10A, a comfort zone setting request packet is generally indicated at 1000. The comfort zone setting request packet 1000 includes a header 1002, a control byte 1004 (0x05), a comfort zone setting request payload 1006, and an FCS 1008. The comfort zone setting request payload 1006 may include user input received via the touch screen of the control element 102.

In FIG. 10B, an acknowledgment packet is generally indicated at 1010. The acknowledgment packet 1010 may include a header 1012, a control byte 1014 (0x06), an acknowledgement payload 1016 (1 byte), and an FCS 1018. The acknowledgment packet 1010 may be sent by the gateway 104 or the control element 102 in response to successful receipt of a signal.

In FIG. 10C, a negative acknowledgment packet is generally indicated at 1020. The negative acknowledgment packet 1020 may include a header 1022, a control byte 1024 (0x07), a negative acknowledgment payload (NACK) 1026 (1 byte), and an FCS 1028. The negative acknowledgment packet may be sent by the gateway 104 or the control element 102 in response to unsuccessful receipt of a signal.

The present disclosure provides an adaptive, Web-assisted energy management technology that works harmoniously with geo-specific natural environments and human interactions. Adaptive algorithms of the system increase a building's thermodynamic efficiency by simplifying and optimizing the occupant-equipment-environment interactions How Does the Intelligent Energy System Work? The system is designed to solve issues that current technologies on the market fail to address. In certain embodiments, the sensors may be peel-and-stick devices for simple installation and operation. To make them even more effective, they harvest energy from ambient light to eliminate the need for batteries (FIGS. 1-3). The control element may include a linguistic human interface that incorporates text and a touchscreen interface to facilitate user interactions.

The simple touch screen allows the user to answer the question "are you comfortable?" Users touch the screen to indicate whether the room is too hot, too cold, too bright or too dark, or comfortable; that's it. No other interaction is required. The system continuously monitors parameters such as temperature, humidity, radiant environment temperature, ambient light level, light color (thus source), and occupancy; and transmits the result through a wireless communications link to the gateway 104, which may communicate at least some of the data to the HVAC management system 112, which may include an intelligent energy engine. The gateway 104 provides wireless connectivity to the control elements 102 as well as plug-and-play and interoperable with numerous systems, including ZigBee® and other protocols. The HVAC management system 112 may be a standalone server and may include an adaptive artificial intelligence (AI) engine. In some embodiments, the adaptive AI engine may be cloud-based and always improving to keep the maintenance and upkeep at the point-of-use low. The HVAC management system may continuously learn and improve the comfort and energy efficiency parameters fed back from users. The HVAC management system 112 may compare individual building data with reference systems developed over time from similar micro- and macro-climate environments, and may provide output to the building subsystems such as HVAC, lighting, windows, zone damper vents, etc. Since the entire system may be wirelessly connected, even the firmware of the sensors (control elements 102) may be updated if new, more effective user interfaces are developed, allowing for seamless improvements and upgrades.

To affect the net consumption of energy without sacrificing building comfort, the HVAC control may address design considerations, equipment strengths and weaknesses, and enhance controls. Better designed buildings and better retrofitting may cause buildings to be or become inherently (passively) more efficient. For example, better insulation, less infiltration, more thermal mass, and other parameters may result in more efficient structures.

Incorporation of better equipment may cause the overall energy consumption to decrease. In particular, utilization of more efficient energy conversion subsystems, such as Ground and Air Source Heat Pumps and Hybrid Domestic Hot Water systems, LED Lighting, energy recovery systems, etc., may reduce overall energy consumption. Further, smart thermal and energy management of buildings may be introduced to manage load profiles and increase the thermodynamic efficiency of building energy conversion subsystems such as the HVAC.

Figure 11:
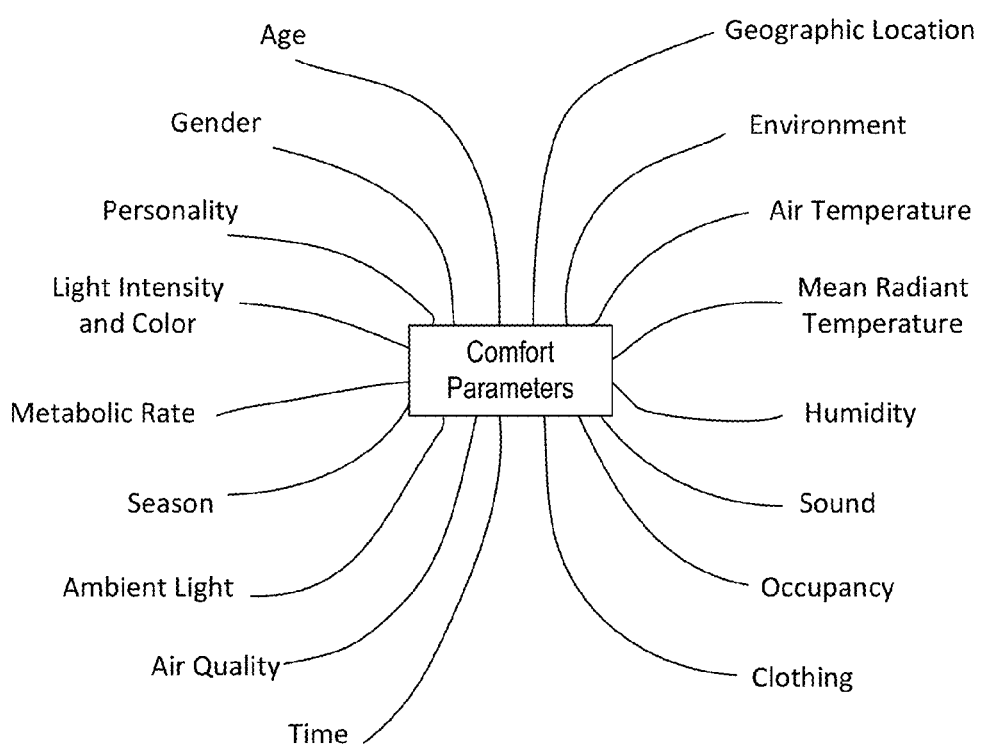
FIG. 11 is a diagram depicting parameters affecting human comfort.

FIG. 11 depicts a set of human comfort factors 1100 that are highly subjective, dynamic and multivariable. The human comfort factors 1100 may include age, gender, personality, light intensity and color, metabolic rate, season, ambient light, air quality, time (of day), geographic location, environment, air temperature, mean radiant temperature, humidity, sound, occupancy, and clothing (clothing being worn).

Figure 12:
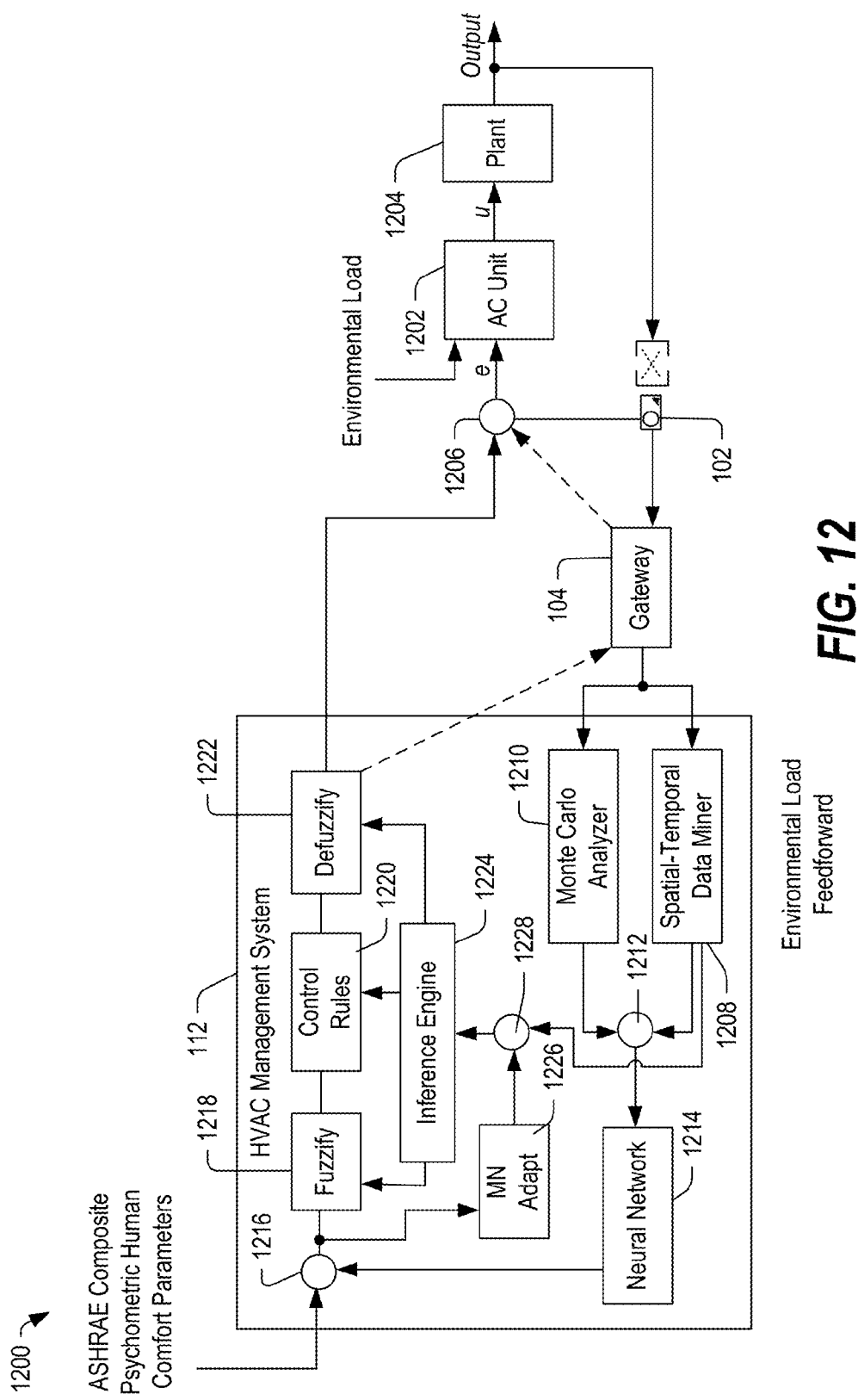
FIG. 12 is a block diagram of an environmental management system according to certain embodiments.

FIG. 12 is a block diagram of an environmental management system 1200 according to certain embodiments. The environmental management system 1200 (or HVAC management system) may include a multivariable adaptive control that uses numerous comfort factors affecting the entire system.

The environmental management system 1200 includes the HVAC management system 112 communicatively coupled to the gateway 104, and optionally to the AC unit 1202. In certain embodiments, signals from the HVAC management system 112 are communicated to the air-conditioning (AC) unit 1202 through the gateway 104 (as indicated by the dashed arrows in FIG. 12). The AC unit 1202 may be coupled to the plant 1204 (i.e., the structure having an environment to be controlled). The plant 120 provides feedback via the distributed control element(s) 102, which transmit sensor data, user input, or any combination thereof to the gateway 104. The gateway 104 communicates the data to the HVAC management system 112.

The HVAC management system 112 may include a Monte Carlo analyzer 1210 and a spatial-temporal data miner 1208, which may process the data to provide respective outputs to a node 1212, which may be coupled to a neural network 1214. The neural network 1214 may include an output coupled to a node 1216, which includes a second input to receive ASHRAE composite psychometric human comfort parameters and which includes an output. The output of the node 1216 may be coupled to inputs of a MN adapt module 1226, which provides an output to a node 1228. The node 1228 includes a second input to receive an output from the spatial-temporal data miner 1208 and includes an output coupled to an inference engine 1224.

The inference engine 1224 includes a first output that is coupled to a fuzzify module 1218, a second output coupled to a control rules module 1220, and a third output coupled to a defuzzify module 1222. The fuzzify module includes an input coupled to the node 1216 and an output coupled to the control rules module 1220. The control rules module 1220 includes an output coupled to the defuzzify module 1222, which has an output coupled to a node 1206. The node 1206 may have an input coupled to the gateway 104, an input coupled to a control element 102, and an output to provide an error signal ε to the AC unit 1202. The AC unit 1202 also receives the environmental load and provides an output (u), which is applied to the plant 1204. The resulting output is then fed back through the control element 102 to the gateway 104 and optionally to the node 1206.

In certain embodiments, in addition to periodically measuring temperature and humidity, the gateway 104 via the control elements 102 may continuously monitor other critical parameters, such as radiant background, mean radiant temperature, ambient light level and color (thus source) and occupancy at regular intervals. The gateway 104 may transmit the resulting data through the gateway 104 to the HVAC management system 112, which may use an AI to process the data and to provide control signals to improve the efficiency of the system. The data miner 1208 may mine the data based on user interactions and specific user demands.

Figure 13:
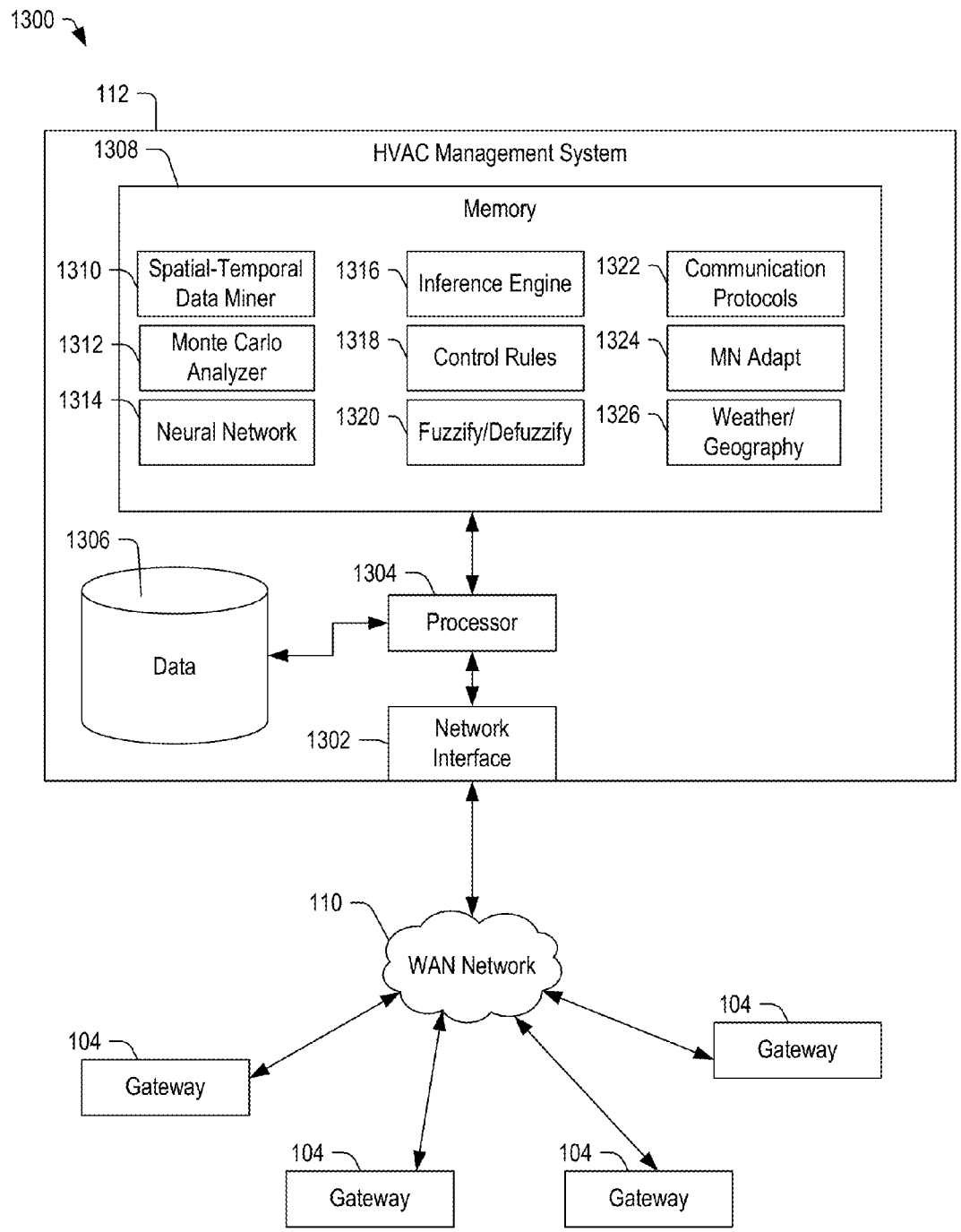
FIG. 13 is a block diagram of an environmental management system according to certain embodiments.

FIG. 13 is a block diagram of an environmental management system 1300 according to certain embodiments. The environmental management system 1300 includes an HVAC management system 112 coupled to multiple gateways 104 through a wide area network (WAN) 110, such as the Internet. The HVAC management system 112 may receive data from multiple gateways 104 and may individually track comfort settings associated with each of the gateways.

In certain embodiments, the HVAC management system 112 may include a network interface 1302 coupled to the network 110, a processor 102 coupled to the network interface 1302, a database 1306, and a memory 1308. In some embodiments, the database 1306 may be part of the memory 1308.

The memory 1308 may store instructions that, when executed, cause the processor to process sensor data using a spatial-temporal data miner 310, process the sensor data using a Monte Carlo analyzer 1312 and process the outputs using a neural network 1314. The memory 1308 may further store instructions that, when executed, may cause the processor to draw inferences from the processed data using an inference engine 1316. The memory 1308 may also include control rules that, when executed, cause the processor 1304 to generate control signals for transmission to the gateway 104 based on fuzzified data from fuzzify/defuzzify instructions 1320. The memory 1308 may also include communication protocols that, when executed, cause the processor 1304 to organize the control signals, data, instructions, or any combination thereof for transmission to the gateway. The memory 1308 may further include adaptation algorithms 1324 that, when executed, cause the processor 1304 to adjust one or more control instructions, to learn from accumulated data, or any combination thereof. The memory 1308 may also store weather/geography information 1326 that may be used by the processor 1304 to process the data according to the geographic location of the structure.

In certain embodiments, the environmental management system 1300 may be an intelligent energy system that may take into account home data including occupant patterns, outside information, temperature, humidity, light, occupancy, etc. The environmental management system 1300 may also take into account micro environment information, such as neighborhood patterns and smart grid information. Further, the environmental management system 1300 may incorporate weather information, such as weather forecasts and energy management trends, and may produce control signals to control lights, HVAC systems, renewable energy systems and so on.

Figure 14:
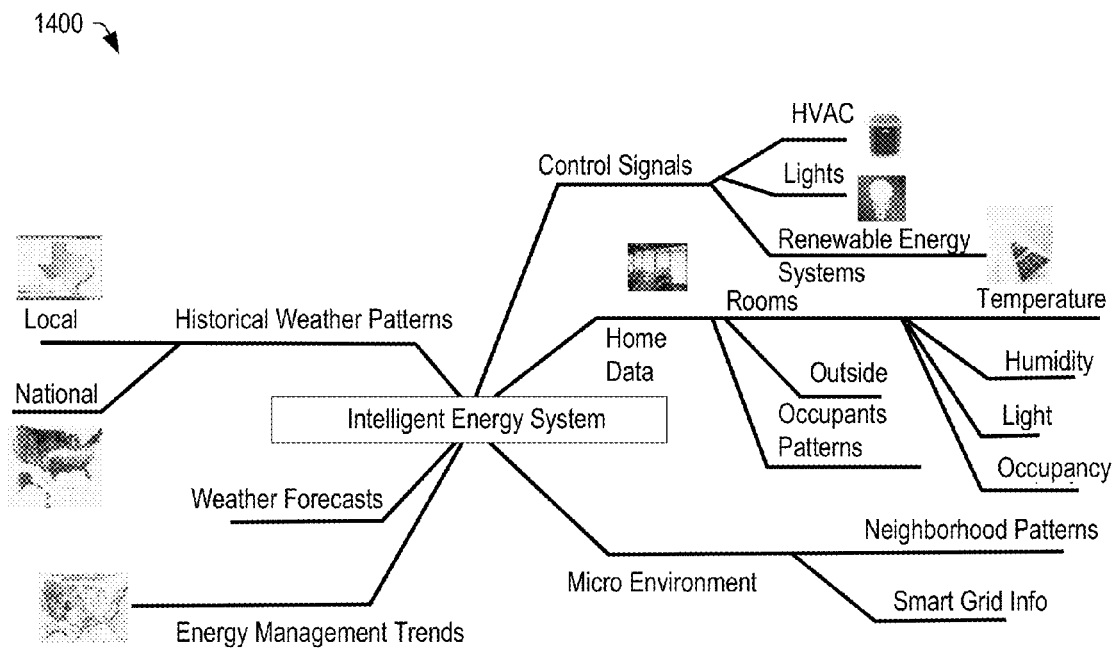
FIG. 14 is a block diagram of an environmental management system 1400 that provides multivariable adaptive control based on numerous comfort factors and external factors affecting the system.

FIG. 14 is a block diagram of an environmental management system 1400 that provides multivariable adaptive control based on numerous comfort factors and external factors affecting the system. As discussed above with respect to FIG. 13, the environmental management system 1400 may incorporate external information, such as weather data, historical information (local and national), energy management trends, and neighborhood information, to enhance the user's experience. The system can learn from others what works best and can adapt the user's controls to provide an enhanced experience.

Figure 15:
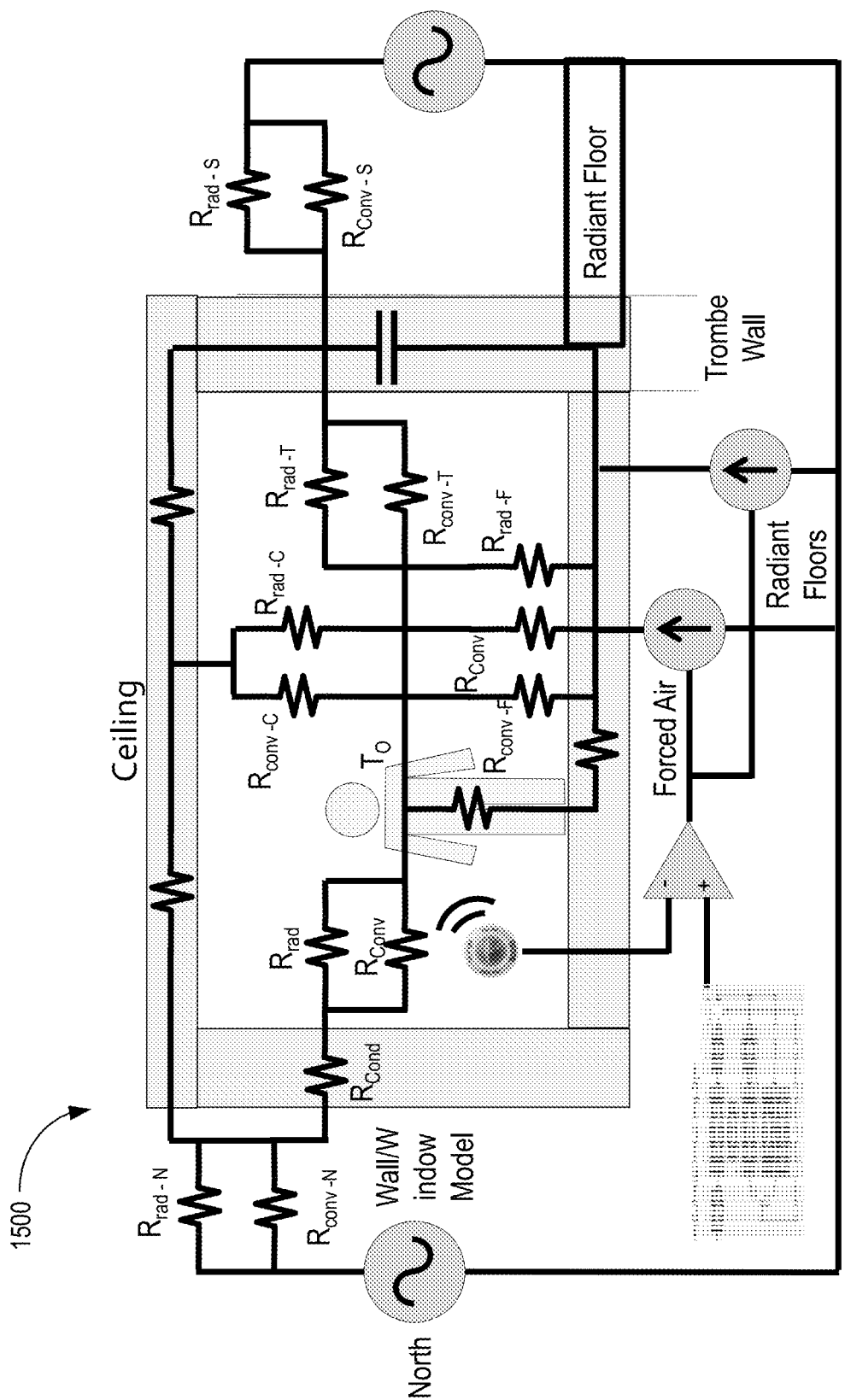
FIG. 15 is a diagram of a multi-variable thermal analysis model of a plant according to certain embodiments.

FIG. 15 is a diagram of a multi-variable thermal analysis model 1500 of a plant (such as a residence) according to certain embodiments. The model 1500 may include north and south wall-window models, including radiant and convection flow models ($R_{rad-N}$ and $R_{conv-N}$). The model 1500 may further include a ceiling model including thermal flow. The model 1500 further includes forced air and radiant floors and includes a Trombe wall, which acts to reduce thermal flow.

The model 1500 includes a control element, which senses various parameters and communicates data to a first input of a comparator, which includes a second input responsive to signals from the HVAC management system 112 and which includes an output coupled to the forced air unit and to the radiant floors to adjust various parameters.

The model 1500 recognizes that there are multiple factors that impact human comfort, which factors may be impacted by the surrounding environment as well as by the structure itself. Further, the model 1500 recognizes that certain features may impact the human comfort experience, which may be adjusted via the control loop provided by the control element 102 and the HVAC management system 112 in conjunction with the HVAC and radiant systems of the plant.

Figure 16:
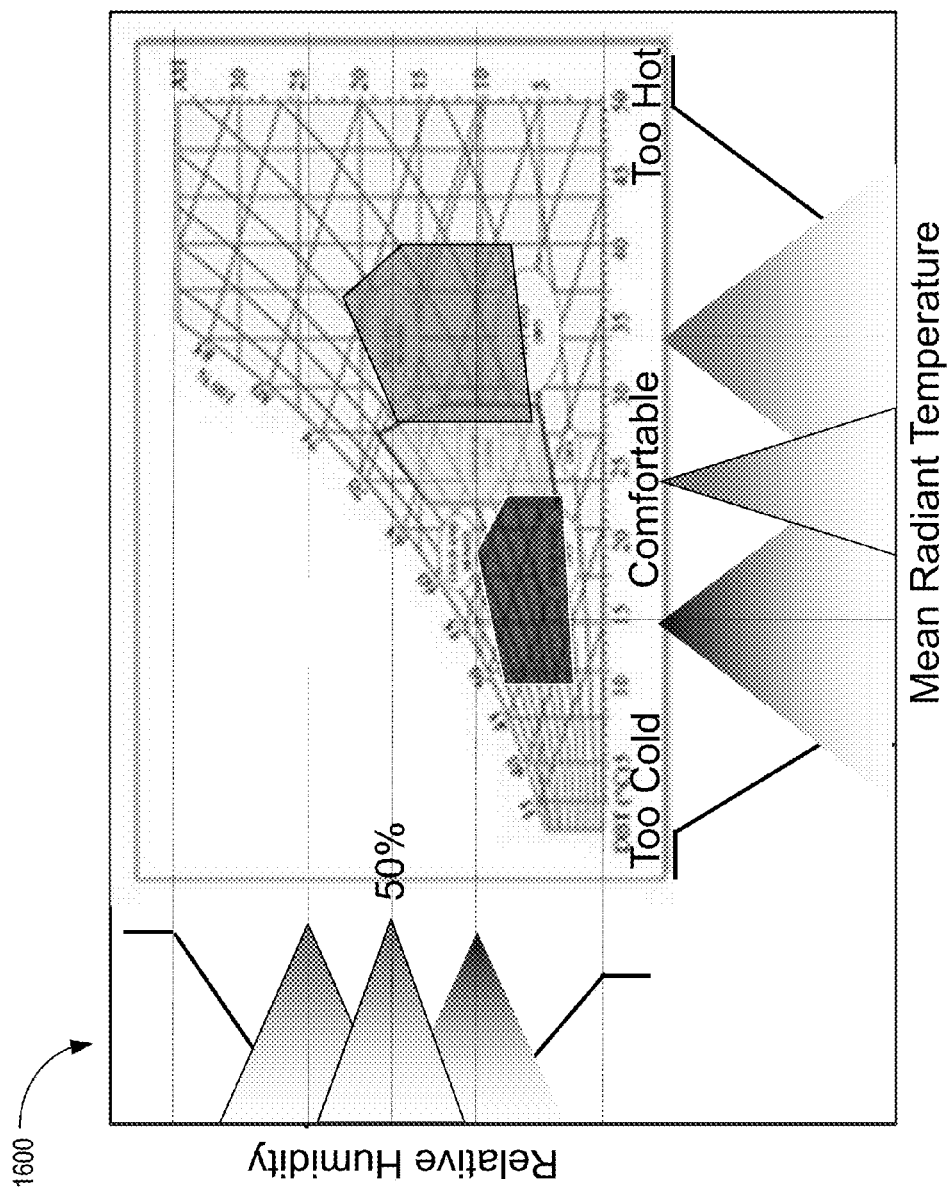
FIG. 16 depicts a graph of relative humidity versus mean radiant temperature in a psychometric chart that correlates such parameters to perceived comfort according to certain embodiments.

FIG. 16 depicts a graph 1600 of relative humidity versus mean radiant temperature in a psychometric chart that correlates such parameters to perceived comfort according to certain embodiments. The graph 1600 indicates a correlation between humidity, temperature and perceived comfort level. The HVAC management system 112 may take advantage of this correlation in providing parameter adjustments to the gateway 104, such that the HVAC system may be adjusted to enhance comfort as opposed to merely raising or lowering the temperature.

FIG. 17 depicts a set of entropy equations according to certain embodiments. In Equation 1, the work performed by the system is written as the change in energy of the system. Equation 1 can be rewritten as shown in Equation 2 or, an increase in the internal energy of a system is its absolute temperature times net entropy change (or heat) minus pressure times the volume (or work). For example, a heat engine, such as that of an automobile, transfers heat from a hot source (combustion of fuel) to a heat sink (ambient air), thus producing work (moving the car). The maximum work efficiency of this cycle is determined by the Carnot efficiency given in Equation (3), which notes that maximum power output is gained when the temperature difference between the hot source and cold sink is at a maximum. Conversely, the reverse of a heat engine is a heat pump. Because heat always flows from a hot source to a cold sink, work is required to lift this heat from the cooler sink to a warmer source. This is the fundamental process by which refrigeration and air conditioning is performed and is denoted in Equation (4).

It is also evident from above equation that minimum work (maximum system efficiency) is achieved when the temperature differential between the heat sink and the hot source is at a minimum. This is why heat pumps provide maximum coefficient of performance in moderate climates (i.e., heat lift is minimized). Entropy is system waste that cannot perform useful work, and it is defined by Equation (5), which indicates that change in entropy equals heat transferred divided by the absolute temperature in K. This equation indicates that transferring heat at a higher temperature and minimizing the thermal difference at which heat is transferred also minimizes entropy gain. This is the fundamental reason that a technique other than threshold based ambient temperature is needed to maximize the efficiency of a home or a building. To be specific what we need to control our building HVAC systems for peak performance depends on far more variables than a set point ambient temperature which trips the unit regardless of other variables.

Figure 18:
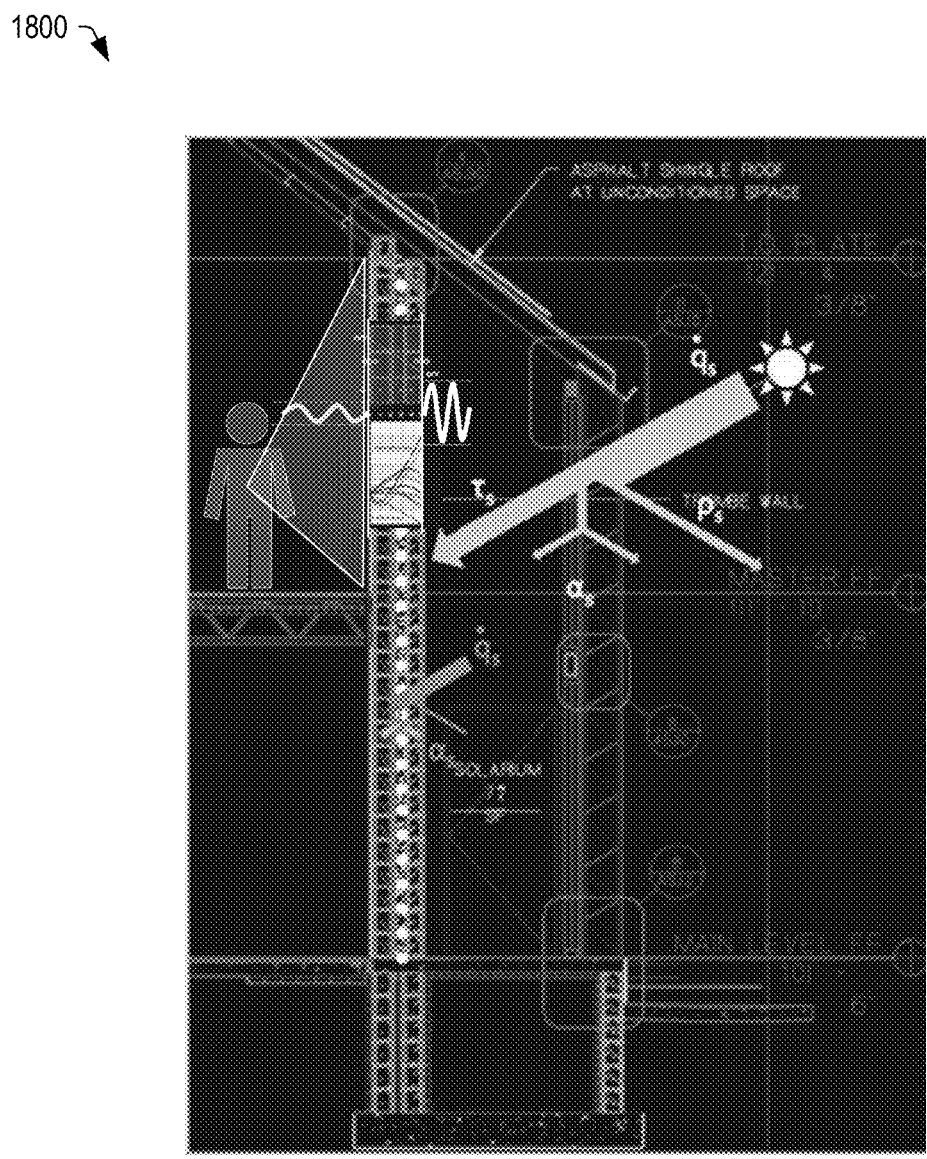
FIG. 18 illustrates a representative example of environmental factors that may impact an environmental management system according to certain embodiments.

Referring now to FIG. 18, for example, a south-facing wall exposed to the winter sun is a good source of radiant heat and source of comfort even if the ambient air temperature of the room has been kept to a few degrees lower than would otherwise be selected as comfortable, before the occupants get home. To know when to turn the equipment on and off and to understand what exact temperature to set the thermostat, the HVAC management system 112 may analyze a number of variables (determined over time) and may determine a solution that is unique to the occupant, to the building, to the time of day and the weather, etc.

Figure 19:
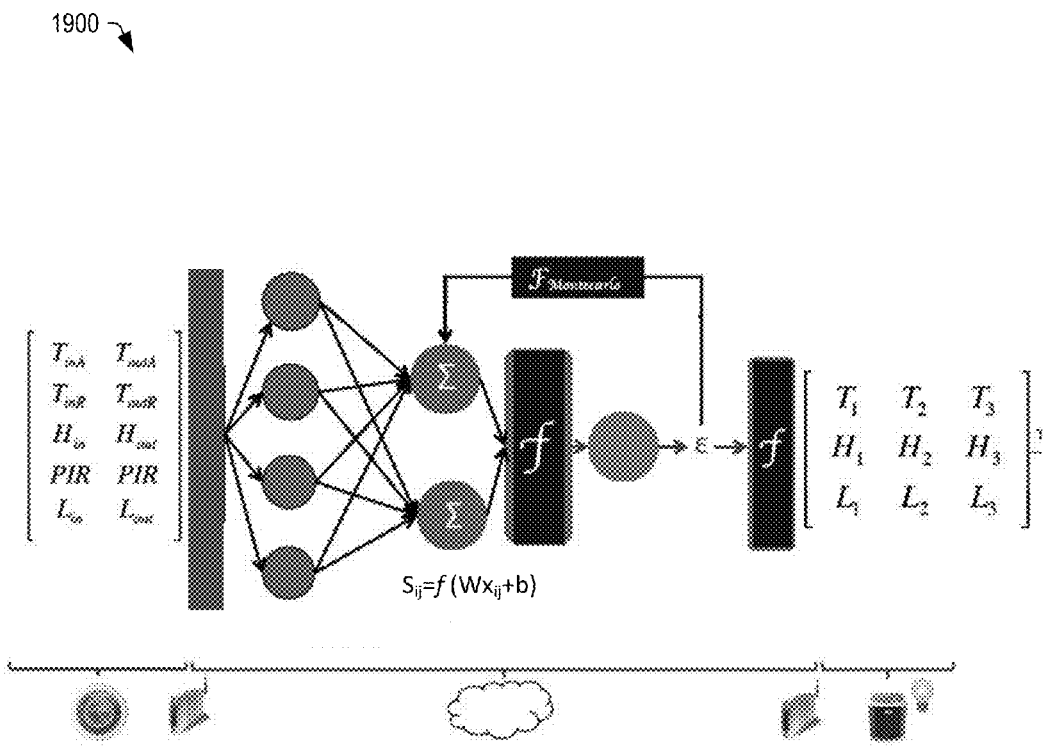
FIG. 19 is a diagram of a neural network-based intelligent energy engine according to certain embodiments.

FIG. 19 is a diagram of a neural network-based intelligent energy engine 1900 according to certain embodiments. The engine 1900 takes into account state space variables to provide a dynamic feedback control system through when the user's comfort level may be effectively managed. In an example, sensor data is applied to determine the comfort error, which is then fed to a function to adjust the various building systems iteratively until the desired comfort level is achieved. Over time, the system may develop intelligent defaults in order to quickly and appropriately adjust the user's environment as desired.

Figure 20:
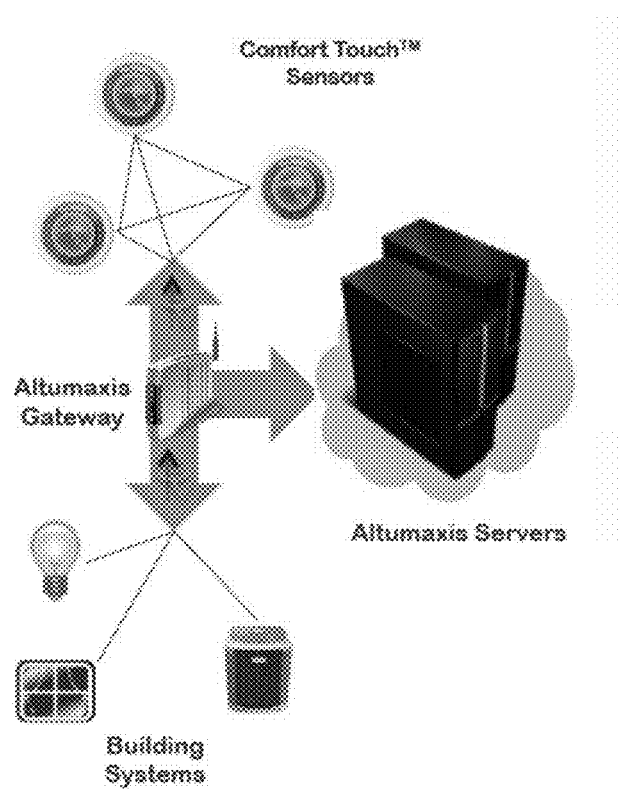
FIG. 20 is a block diagram of an environmental management system according to certain embodiments.

FIG. 20 is a block diagram of an environmental management system 2000 according to certain embodiments. In the illustrated example, the environmental management system 2000 may utilize touch sensors, which may communicate with servers through a gateway, which is configured to communicate with one or more systems of a building. The servers, the gateway and the touch sensors may be commercially available through Altumaxis, Inc. of Austin, Tex.

Figure 21:
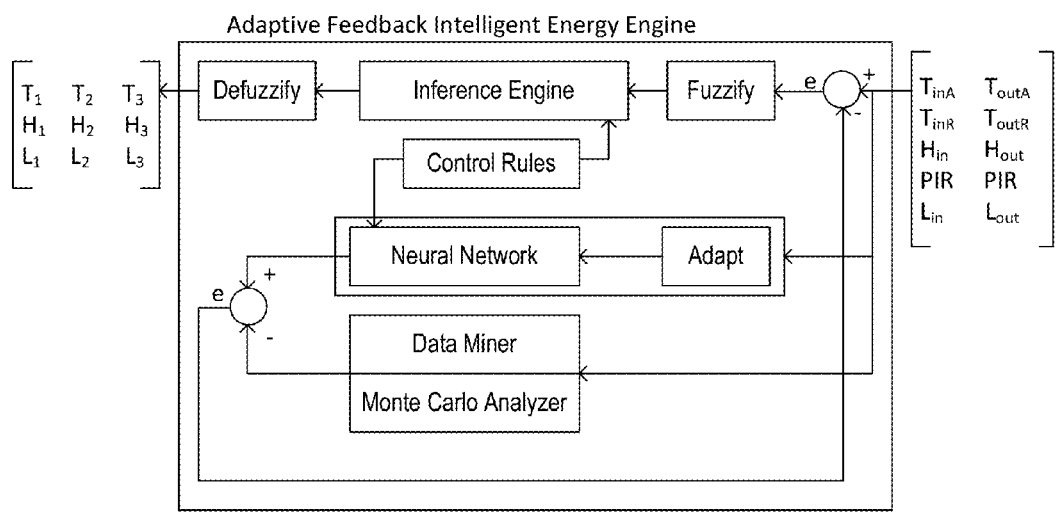
FIG. 21 is a block diagram of an adaptive feedback intelligent energy engine according to certain embodiments.

FIG. 21 is a block diagram of an adaptive feedback intelligent energy engine 2100 according to certain embodiments. The illustrated example is similar to that described above with respect to FIG. 12, except that the neural network and adaptation features are incorporated into a single block, and the control rules are out of the data path between the fuzzify and defuzzify blocks and are replaced with the inference engine.

Figure 22:
FIG. 22 is a perspective view of a home, which may use the energy systems of FIGS. 1-22, according to certain embodiments.

FIG. 22 is a perspective view of a residence that may utilize the systems and methods described above with respect to FIGS. 1-22.

Although the present invention has been described with reference to preferred embodiments, workers skilled in the art will recognize that changes may be made in form and detail without departing from the scope of the invention.

What is claimed is:

1. An apparatus comprising:
 a plurality of sensors including a radiant temperature sensor, an ambient air temperature sensor, and a humidity sensor;
 a transmitter coupled to the plurality of sensors and configured send data to a gateway through a wireless communication link, the gateway configured to couple to a network and to communicate data to a gateway management system through the network;
 a solar cell configured to provide power to the plurality of sensors and the transmitter; and
 an adhesive backing configured to secure the apparatus to a structure.

2. The apparatus of claim 1, further comprising a touchscreen interface to:
 provide a graphical user interface; and
 receive input corresponding to the graphical user interface.

3. The apparatus of claim 1, wherein the plurality of sensors further includes a light sensor.

4. The apparatus of claim 3, wherein the light sensor comprises at least one of an infrared sensor, a red green blue (RGB) sensor, and an ambient light sensor.

5. The apparatus of claim 1, wherein the plurality of sensors comprises a motion sensor.

6. The apparatus of claim 1, further comprising:
 a timer; and
 wherein the plurality of sensors and the transmitter operate periodically in response to a signal from the timer.

7. An environmental control system comprising:
  a plurality of control elements, at least some of the control elements including:
    a plurality of sensors including an ambient air temperature sensor and a radiant temperature sensor;
    a transceiver coupled to the plurality of sensors and configured send data to a wireless communications link; and
    a solar cell configured to provide power to the plurality of sensors and the transmitter; and
  a gateway configured to receive data from the transceiver and to selectively control a heating, ventilation and air-conditioning (HVAC) system according to the data.

8. The environmental control system of claim 7, wherein each control element includes an adhesive backing configurable to secure the control element to a structure.

9. The environmental control system of claim 7, wherein each control element further comprises a touch-screen interface to:
  provide a graphical user interface; and
  receive input corresponding to the graphical user interface.

10. The environmental control system of claim 7, wherein the the plurality of sensors further includes:
  a humidity sensor; and
  a light sensor.

11. The environmental control system of claim 10, wherein the light sensor comprises at least one of an infrared sensor and a red green blue (RGB) sensor.

12. The environmental control system of claim 7, wherein the at least one sensor comprises a motion sensor.

13. The environmental control system of claim 7, wherein each control element further comprises:
  a timer; and
  wherein the at least one sensor and the transmitter operate periodically in response to a signal from the timer.

14. An apparatus comprising:
  a touch screen;
  a plurality of sensors including an ambient air temperature sensor, a radiant temperature sensor, and a light sensor configured to capture sensor data;
  a transmitter coupled to the touch screen and configured send data from the touch screen and the sensor data to a gateway through a wireless communication link; and
  a solar cell configured to provide power to the touch screen, the plurality of sensors, and the transmitter.

15. The apparatus of claim 14, further comprising an adhesive backing configured to secure the apparatus to a structure.

16. The apparatus of claim 14, wherein the touch screen is configured to:
  provide a graphical user interface; and
  receive input corresponding to the graphical user interface.

17. The apparatus of claim 14, wherein the plurality of sensors further includes a humidity sensor.

18. The apparatus of claim 17, wherein the sensor data sent by the transmitter includes at least one of ambient temperature data, radiant temperature data, humidity data, and light data.

19. The apparatus of claim 14, wherein the plurality of sensors further includes an infrared sensor.

20. The environmental control system of claim 10, wherein the light sensor comprises an ambient light sensor.

* * * * *